US011222362B2

(12) United States Patent
Whiteman et al.

(10) Patent No.: US 11,222,362 B2
(45) Date of Patent: Jan. 11, 2022

(54) DYNAMIC DETERMINATION OF LOCALIZATION SOURCE FOR WEB SITE CONTENT

(71) Applicant: MOTIONPOINT CORPORATION, Coconut Creek, FL (US)

(72) Inventors: Chuck Whiteman, Coconut Creek, FL (US); Eugene Alvarez, Coconut Creek, FL (US); Enrique Travieso, Davie, FL (US); Will Fleming, Boca Raton, FL (US); Fabio Beltramini, Boca Raton, FL (US)

( * ) Notice: Subject to any disclaimer, the term of this patent is extended or adjusted under 35 U.S.C. 154(b) by 732 days.

(21) Appl. No.: 13/840,747

(22) Filed: Mar. 15, 2013

(65) Prior Publication Data

US 2014/0200955 A1 Jul. 17, 2014

Related U.S. Application Data

(60) Provisional application No. 61/752,778, filed on Jan. 15, 2013.

(51) Int. Cl.
*G06Q 30/02* (2012.01)

(52) U.S. Cl.
CPC ..... *G06Q 30/0269* (2013.01); *G06Q 30/0205* (2013.01); *G06Q 30/0206* (2013.01); *G06Q 30/0249* (2013.01); *G06Q 30/0254* (2013.01); *G06Q 30/02* (2013.01)

(58) Field of Classification Search
CPC .... G06Q 30/02; G06Q 30/00; G06Q 30/0201; G06Q 30/0205; G06Q 30/0206; H04L 67/18

USPC ............................................... 705/7.11–7.42
See application file for complete search history.

(56) References Cited

U.S. PATENT DOCUMENTS

| | | | | |
|---|---|---|---|---|
| 6,526,426 B1 * | 2/2003 | Lakritz | ............... | G06F 17/2258 704/8 |
| 6,857,022 B1 * | 2/2005 | Scanlan | .................. | G06F 40/58 709/229 |
| 7,383,320 B1 * | 6/2008 | Silberstein | .......... | G06F 17/3089 707/E17.116 |
| 7,571,092 B1 * | 8/2009 | Nieh | ..................... | G06F 9/4448 704/1 |

(Continued)

FOREIGN PATENT DOCUMENTS

WO WO 2008028733 A1 * 3/2008
WO WO 2014027237 A1 * 2/2014

OTHER PUBLICATIONS

U.S. Appl. No. 61/682,343, Specification.*

(Continued)

*Primary Examiner* — Rutao Wu
*Assistant Examiner* — Sarjit S Bains
(74) *Attorney, Agent, or Firm* — Venable LLP

(57) ABSTRACT

Method and system for localizing an element present in a piece of content having a plurality of elements. A cost of localizing an element with respect to each of one or more localization sources is first computed. At least one criterion based on which a localization source for localizing the element is to be determined is obtained. A localization source for localizing the element is then selected based on an assessment with respect to the at least one criterion. The element of the content is then localized using the selected localization source.

12 Claims, 27 Drawing Sheets

(56) References Cited

U.S. PATENT DOCUMENTS

| | | | | |
|---|---|---|---|---|
| 7,636,656 | B1* | 12/2009 | Nieh | G06F 17/289 704/1 |
| 8,249,854 | B2* | 8/2012 | Nikitin | G06F 17/289 704/2 |
| 8,296,463 | B2* | 10/2012 | Cheng | G06F 17/3089 709/246 |
| 8,645,411 | B1* | 2/2014 | Bandaru | G06F 40/114 707/769 |
| 8,812,295 | B1* | 8/2014 | Swerdlow | G06F 17/2705 704/8 |
| 2002/0120762 | A1* | 8/2002 | Cheng | G06F 17/3089 709/230 |
| 2002/0194300 | A1* | 12/2002 | Lin | G06F 17/289 709/217 |
| 2003/0005159 | A1* | 1/2003 | Kumhyr | G06F 16/958 709/246 |
| 2003/0084401 | A1* | 5/2003 | Abel et al. | 715/501.1 |
| 2003/0154071 | A1* | 8/2003 | Shreve | G06F 17/2845 704/9 |
| 2004/0102956 | A1* | 5/2004 | Levin | G06F 17/2735 704/2 |
| 2004/0167784 | A1* | 8/2004 | Travieso et al. | 704/270.1 |
| 2004/0205118 | A1* | 10/2004 | Yu | G06F 17/212 709/203 |
| 2006/0200766 | A1* | 9/2006 | Lakritz | G06F 15/00 715/234 |
| 2006/0212575 | A1* | 9/2006 | Lin | H04L 67/02 709/226 |
| 2006/0271352 | A1* | 11/2006 | Nikitin | G06F 40/58 704/9 |
| 2009/0138379 | A1* | 5/2009 | Scheman | 705/27 |
| 2009/0171802 | A1* | 7/2009 | Raygoza | G06Q 20/12 705/26.1 |
| 2009/0192783 | A1* | 7/2009 | Jurach, Jr. | G06F 17/2827 704/4 |
| 2009/0287471 | A1* | 11/2009 | Bennett | G06F 17/275 704/3 |
| 2009/0299726 | A1* | 12/2009 | Canu | G06Q 10/10 704/3 |
| 2009/0327866 | A1* | 12/2009 | Li et al. | 715/234 |
| 2010/0107114 | A1* | 4/2010 | Zachcial | G06F 17/30867 715/780 |
| 2010/0169764 | A1* | 7/2010 | Travieso | G06F 40/44 715/239 |
| 2011/0082683 | A1* | 4/2011 | Soricut | G06F 40/58 704/2 |
| 2011/0082684 | A1* | 4/2011 | Soricut | G06F 17/289 704/2 |
| 2011/0172987 | A1* | 7/2011 | Kent | G06F 17/241 704/3 |
| 2011/0191165 | A1* | 8/2011 | Kiseli | G06Q 30/0246 705/14.45 |
| 2011/0282645 | A1* | 11/2011 | Khuda | G06F 17/289 704/3 |
| 2012/0010995 | A1* | 1/2012 | Skirpa | G06F 3/0481 705/14.49 |
| 2012/0016865 | A1* | 1/2012 | Travieso | G06F 17/2827 707/711 |
| 2012/0017146 | A1* | 1/2012 | Travieso | G06F 17/2827 715/265 |
| 2012/0159430 | A1* | 6/2012 | Waldbaum | G06F 9/4448 717/106 |
| 2012/0185236 | A1* | 7/2012 | Blodgett | G06F 40/58 704/2 |
| 2013/0091425 | A1* | 4/2013 | Hughes et al. | 715/259 |
| 2013/0097488 | A1* | 4/2013 | Coman | H04L 41/0246 715/243 |
| 2013/0124987 | A1* | 5/2013 | Lakritz | G06F 17/289 715/264 |
| 2014/0081618 | A1* | 3/2014 | Kim | G06F 17/289 704/2 |
| 2014/0100844 | A1* | 4/2014 | Stieglitz | G09B 19/06 704/3 |

OTHER PUBLICATIONS

U.S. Appl. No. 61/682,343, Drawings.*
Michael Fleming and Robin Cohen, "Mixed-Initiative Translation of Web Pages", in Envisioning Machine Translation in the Information Future: 4th Conference of the Association for Machine Translation in the Americas, AMTA 2000, Cuernavaca, Mexico, Oct. 10-14, 2000 Proceedings, pp. 25-29. (Year: 2000).*

* cited by examiner

| | | 411 | 412 | 413 | 414 | 415 | 416 | 417 | 418 |
|---|---|---|---|---|---|---|---|---|---|
| 410 | Category | Item | Average Sale Price | Gross Margin % | Projected Item Life (months) | Projected Views per Month | Projected Conversion Percentage | In-store Factor | Estimated Value |
| | Small TVs | Sony Bravia 25" 3D LCD | $ 400 | 19% | 15 | 6,000 | 0.15% | 5.0 | $51,300 |
| | Small TVs | Samsung 22" 1080p LCD | $ 250 | 21% | 13 | 2,200 | 0.12% | 5.0 | $9,009 |
| | Small TVs | LG 23" 1080p LCD | $ 300 | 18% | 13 | 900 | 0.13% | 5.0 | $4,107 |
| | Small TVs | Dynex 19" 1080p LCD | $ 200 | 17% | 10 | 600 | 0.06% | 3.0 | $367 |
| | Small TVs | Dynex 15" 720p LCD | $ 150 | 11% | 8 | 300 | 0.03% | 2.0 | $24 |

FIG. 4B

| | | 411 | 412 | 420 | 421 | 422 | 423 | 424 | 425 |
|---|---|---|---|---|---|---|---|---|---|
| 410 | Category | Item | Average Sale Price | Category Based Gross Margin% | Category Based Item Life (months) | Category Based Views (per month) | Category Based Conversion Percentage | Category Based In-store Factor | Estimated Value |
| | Small TVs | Sony Bravia 25" 3D LCD | $ 400 | 17% | 10 | 1,200 | 0.10% | 4.0 | $3,264 |
| | Small TVs | Samsung 22" 1080p LCD | $ 250 | 17% | 10 | 1,200 | 0.10% | 4.0 | $2,040 |
| | Small TVs | LG 23" 1080p LCD | $ 300 | 17% | 10 | 1,200 | 0.10% | 4.0 | $2,448 |
| | Small TVs | Dynex 19" 1080p LCD | $ 200 | 17% | 10 | 1,200 | 0.10% | 4.0 | $1,632 |
| | Small TVs | Dynex 15" 720p LCD | $ 150 | 17% | 10 | 1,200 | 0.10% | 4.0 | $1,224 |

| 510 | 511 | 512 | 513 | 514 |
|---|---|---|---|---|
| Article Category | Article Title | Average Ad Pay per Mille (PPM) | Projected Lifetime Views (000) | Estimated Value |
| Sports | Manchester United IPO | $ 5.00 | 15 | $75 |
| Sports | Highest Paid Female Olympic Athletes | $ 5.00 | 35 | $175 |
| Humor | My Own Private India | $ 4.00 | 8 | $32 |
| Humor | My Very Own Platform | $ 4.00 | 5 | $20 |
| Humor | I Will Be Your Server | $ 4.00 | 6 | $24 |

FIG. 5A

| 520 | 521 | 522 | 523 | 524 | 525 |
|---|---|---|---|---|---|
| Product Category | Item | Average Sale Price | Commission % | Projected Number of Sales | Estimated Value |
| Small TVs | Sony Bravia 25" 3D LCD | $ 400 | 3% | 200 | $2,400 |
| Small TVs | Samsung 22" 1080p LCD | $ 250 | 3% | 150 | $1,125 |
| Small TVs | LG 23" 1080p LCD | $ 300 | 2% | 50 | $300 |
| Small TVs | Dynex 19" 1080p LCD | $ 200 | 2% | 30 | $120 |
| Small TVs | Dynex 15" 720p LCD | $ 150 | 2% | 100 | $300 |

FIG. 5B

| | 611 | 612 | 613 | 614 | 615 | 616 | 617 | 618 | 619 | 620 |
|---|---|---|---|---|---|---|---|---|---|---|
| Category | Item | Detail Description Number of Words | No Translation Cost per Word | Cost of No Translation | Machine Translation Cost per Word | Cost of Machine Translation | Human Translation Cost per Word | Cost of Human Translation | Copy Edit Cost per Word | Cost of Copy Edit |
| Small TVs | Sony Bravia 25" 3D LCD | 300 | $0.001 | $0.30 | $0.05 | $15.00 | $0.25 | $75.00 | $0.50 | $150.00 |
| Small TVs | Samsung 22" 1080p LCD | 400 | $0.001 | $0.40 | $0.05 | $20.00 | $0.25 | $100.00 | $0.50 | $200.00 |
| Small TVs | LG 23" 1080p LCD | 440 | $0.001 | $0.44 | $0.05 | $22.00 | $0.25 | $110.00 | $0.50 | $220.00 |
| Small TVs | Dynex 19" 1080p LCD | 420 | $0.001 | $0.42 | $0.05 | $21.00 | $0.25 | $105.00 | $0.50 | $210.00 |
| Small TVs | Dynex 15" 720p LCD | 430 | $0.001 | $0.43 | $0.05 | $21.50 | $0.25 | $107.50 | $0.50 | $215.00 |

| 1010 | 1011 | 1012 | 1013 | 1014 | 1015 | 1016 | 1017 | 1018 | 1019 | 1020 |
|---|---|---|---|---|---|---|---|---|---|---|
| Category | Item | Average Sale Price | Gross Margin % | In-store Factor | Projected Item Life (months) | Actual Number of Views in Test Month | Actual Conversion Percentage Machine Translation | Estimated Value Machine Translation | Category Based Human Translation Conversion Percentage | Estimated Value Human Translation |
| Small TVs | Sony Bravia 25" 3D LCD | $ 400 | 19% | 5.0 | 15 | 6,122 | 0.14% | $48,854 | 0.15% | $52,343 |
| Small TVs | Samsung 22" 1080p LCD | $ 250 | 21% | 5.0 | 13 | 2,195 | 0.11% | $8,239 | 0.15% | $11,236 |
| Small TVs | LG 23" 1080p LCD | $ 300 | 18% | 5.0 | 13 | 912 | 0.12% | $3,841 | 0.15% | $4,802 |
| Small TVs | Dynex 19" 1080p LCD | $ 200 | 17% | 3.0 | 10 | 599 | 0.15% | $916 | 0.15% | $916 |
| Small TVs | Dynex 15" 720p LCD | $ 150 | 11% | 2.0 | 8 | 275 | 0.06% | $44 | 0.15% | $109 |

FIG. 10B

| 1050 | 1051 | 1018 | 1053 | 1054 | 1020 | 1056 | 1057 | 1058 |
|---|---|---|---|---|---|---|---|---|
| Category | Item | Estimated Value Machine Translation | Cost of Machine Translation | Contribution Margin of Machine Translation | Estimated Value Human Translation | Cost of Human Translation | Contribution Margin of Human Translation | Promote to Human Translation? |
| Small TVs | Sony Bravia 25" 3D LCD | $48,854 | $15.00 | $ 48,839 | $52,343 | $75.00 | $ 52,268 | Yes |
| Small TVs | Samsung 22" 1080p LCD | $8,239 | $20.00 | $ 8,219 | $11,236 | $100.00 | $ 11,136 | Yes |
| Small TVs | LG 23" 1080p LCD | $3,841 | $22.00 | $ 3,819 | $4,802 | $110.00 | $ 4,692 | Yes |
| Small TVs | Dynex 19" 1080p LCD | $916 | $21.00 | $ 895 | $916 | $105.00 | $ 811 | No |
| Small TVs | Dynex 15" 720p LCD | $44 | $21.50 | $ 22 | $109 | $107.50 | $ 1 | No |

FIG. 12A

| | 1211 | 1212 | 1213 | 1214 | 1215 | 1216 | 1217 | 1218 | 1219 | 1220 |
|---|---|---|---|---|---|---|---|---|---|---|
| Category | Item | Average Sale Price | Gross Margin % | In-store Factor | Projected Item Life (months) | Actual Number of Views in Test Month | Actual Conversion Percentage Machine Translation | Estimated Value Machine Translation | Actual Conversion Percentage Human Translation | Estimated Value Human Translation |
| Small TVs | Sony Bravia 25" 3D LCD | $ 400 | 19% | 5.0 | 15 | 6,122 | 0.14% | $48,854 | 0.16% | $55,833 |
| Small TVs | Samsung 22" 1080p LCD | $ 250 | 21% | 5.0 | 13 | 2,195 | 0.13% | $9,738 | 0.13% | $9,738 |
| Small TVs | LG 23" 1080p LCD | $ 300 | 18% | 5.0 | 13 | 912 | 0.12% | $3,841 | 0.12% | $3,841 |
| Small TVs | Dynex 19" 1080p LCD | $ 200 | 17% | 3.0 | 10 | 599 | 0.15% | $916 | 0.16% | $978 |
| Small TVs | Dynex 15" 720p LCD | $ 150 | 11% | 2.0 | 8 | 275 | 0.06% | $44 | 0.10% | $73 |

FIG. 12B

| | 1251 | 1218 | 1253 | 1254 | 1220 | 1256 | 1257 | 1258 |
|---|---|---|---|---|---|---|---|---|
| Category | Item | Estimated Value Machine Translation | Cost of Machine Translation | Contribution Margin of Machine Translation | Estimated Value Human Translation | Cost of Human Translation | Contribution Margin of Human Translation | Optimized Localization Source |
| Small TVs | Sony Bravia 25" 3D LCD | $48,854 | $15.00 | $ 48,839 | $55,833 | $75.00 | $ 55,758 | Human Translation |
| Small TVs | Samsung 22" 1080p LCD | $9,738 | $20.00 | $ 9,718 | $9,738 | $100.00 | $ 9,638 | Machine Translation |
| Small TVs | LG 23" 1080p LCD | $3,841 | $22.00 | $ 3,819 | $3,841 | $110.00 | $ 3,731 | Machine Translation |
| Small TVs | Dynex 19" 1080p LCD | $916 | $21.00 | $ 895 | $978 | $105.00 | $ 873 | Machine Translation |
| Small TVs | Dynex 15" 720p LCD | $44 | $21.50 | $ 22 | $73 | $107.50 | $ (35) | Machine Translation |

FIG. 13A

| Category | Item | Average Sale Price | Gross Margin % | In-store Factor | Projected Item Life (months) | Actual Number of Views in Test Month | Actual Conversion Percentage Machine Translation | Estimated Value Machine Translation | Cost of Machine Translation | Actual Conversion Percentage Human Translation | Estimated Value Human Translation | Cost of Human Translation |
|---|---|---|---|---|---|---|---|---|---|---|---|---|
| Small TVs | Sony Bravia 25" 3D LCD | $ 400 | 19% | 5.0 | 15 | 6,122 | 0.14% | $48,854 | $15.00 | 0.16% | $55,833 | $75.00 |
| Small TVs | Samsung 22" 1080p LCD | $ 250 | 21% | 5.0 | 13 | 2,195 | 0.13% | $9,738 | $20.00 | 0.13% | $9,738 | $100.00 |
| Small TVs | LG 23" 1080p LCD | $ 300 | 18% | 5.0 | 13 | 912 | 0.12% | $3,841 | $22.00 | 0.12% | $3,841 | $110.00 |
| Small TVs | Dynex 19" 1080p LCD | $ 200 | 17% | 3.0 | 10 | 599 | 0.15% | $916 | $21.00 | 0.16% | $978 | $105.00 |
| Small TVs | Dynex 15" 720p LCD | $ 150 | 11% | 2.0 | 8 | 275 | 0.06% | $44 | $21.50 | 0.10% | $73 | $107.50 |

FIG. 13B

SMALL TV CATEGORY ANALYSIS

| Average Estimated Value Machine Translation | Average Cost of Machine Translation | Contribution Margin of Machine Translation | Contribution ROI Machine Translation | Average Estimated Value Human Translation | Average Cost of Human Translation | Contribution Margin of Human Translation | Contribution ROI Human Translation | Optimum Localization Source for Category Small TVs |
|---|---|---|---|---|---|---|---|---|
| $12,679 | $19.90 | $ 12,659 | 63611% | $14,092 | $99.50 | $ 13,993 | 14063% | Machine Translation |

FIG. 15A

| | 1510 | 1511 | 1512 | 1513 | 1514 | 1515 | 1516 | 1517 | 1518 | 1519 | 1520 | 1521 | 1522 | 1523 | 1524 |
|---|---|---|---|---|---|---|---|---|---|---|---|---|---|---|---|
| Category | Item | Average Sale Price | Gross Margin % | In-store Factor | Projected Item Life (months) | Actual Number of Views in Test Month | Actual Conversion Percentage No Translation | Estimated Value No Translation | Category Based Conversion Percentage Lift - Machine Translation | Estimated Value Machine Translation | Category Based Conversion Percentage Lift - Human Translation | Estimated Value Human Translation | Category Based Conversion Percentage Lift - Copy Edit | Estimated Value Copy Edit |
| Small TVs | Sony Bravia 25" 3D LCD | $ 400 | 19% | 5.0 | 15 | 6,122 | 0.08% | $27,916 | 10.00% | $30,708 | 18.00% | $32,941 | 20.00% | $33,500 |
| Small TVs | Samsung 22" 1080p LCD | $ 250 | 21% | 5.0 | 13 | 2,195 | 0.08% | $5,992 | 10.00% | $6,592 | 18.00% | $7,071 | 20.00% | $7,191 |
| Small TVs | LG 23" 1080p LCD | $ 300 | 18% | 5.0 | 13 | 912 | 0.07% | $2,241 | 10.00% | $2,465 | 18.00% | $2,644 | 20.00% | $2,689 |
| Small TVs | Dynex 19" 1080p LCD | $ 200 | 17% | 3.0 | 10 | 599 | 0.06% | $367 | 10.00% | $403 | 18.00% | $433 | 20.00% | $440 |
| Small TVs | Dynex 15" 720p LCD | $ 150 | 11% | 2.0 | 8 | 275 | 0.06% | $44 | 10.00% | $48 | 18.00% | $51 | 20.00% | $52 |

FIG. 15B

| Contribution ROI Hurdle Rate | 300% | | | | | | | | | | | | | | | | |
|---|---|---|---|---|---|---|---|---|---|---|---|---|---|---|---|---|---|
| | 1531 | 1518 | 1533 | 1534 | 1535 | 1520 | 1537 | | 1539 | 1522 | 1541 | 1542 | 1543 | 1524 | 1545 | 1546 | 1547 | 1548 |
| Category | Item | Estimated Value No Translation | Cost of No Translation | Contribution Margin of No Translation | Contribution ROI of No Translation | Estimated Value Machine Translation | Cost of Machine Translation | Contribution Margin of Machine Translation | Contribution ROI of Machine Translation | Estimated Value Human Translation | Cost of Human Translation | Contribution Margin of Human Translation | Contribution ROI of Human Translation | Estimated Value Copy Edit | Cost of Copy Edit | Contribution Margin of Copy Edit | Contribution ROI of Copy Edit | Optimum Localization Source |
| Small TVs | Sony Bravia 25" 3D LCD | $27,916 | $0.30 | $ 27,916 | 930534% | $30,708 | $15.00 | $ 30,693 | 204620% | $32,941 | $75.00 | $ 32,866 | 43822% | $33,500 | $150.00 | $ 33,350 | 22233% | Copy Edit |
| Small TVs | Samsung 22" 1080p LCD | $5,992 | $0.40 | $ 5,992 | 1497988% | $6,592 | $20.00 | $ 6,572 | 32858% | $7,071 | $100.00 | $ 6,971 | 6971% | $7,191 | $200.00 | $ 6,991 | 3495% | Copy Edit |
| Small TVs | LG 23" 1080p LCD | $2,241 | $0.44 | $ 2,240 | 509169% | $2,465 | $22.00 | $ 2,443 | 11104% | $2,644 | $110.00 | $ 2,534 | 2304% | $2,689 | $220.00 | $ 2,469 | 1122% | Translation |
| Small TVs | Dynex 19" 1080p LCD | $367 | $0.42 | $ 366 | 87183% | $403 | $21.00 | $ 382 | 1820% | $433 | $105.00 | $ 328 | 312% | $440 | $210.00 | $ 230 | 109% | Machine Translation |
| Small TVs | Dynex 15" 720p LCD | $44 | $0.43 | $ 43 | 10030% | $48 | $21.50 | $ 26 | 125% | $51 | $107.50 | $ (56) | -52% | $52 | $215.00 | $ (163) | -76% | No Translation |

FIG. 16A

| | 1611 | 1612 | 1613 | 1614 | 1615 | 1616 | 1617 | 1618 | 1619 | 1620 | 1621 | 1622 | 1623 | 1624 |
|---|---|---|---|---|---|---|---|---|---|---|---|---|---|---|
| 1610 Category | Item | Average Sale Price | Gross Margin % | In-store Factor | Projected Item Life (months) | Actual Number of Views in Test Month | Actual Conversion Percentage No Translation | Estimated Value No Translation | Actual Conversion Percentage Machine Translation | Estimated Value Machine Translation | Actual Conversion Percentage Human | Estimated Value Human Translation | Actual Conversion Percentage Copy Edit | Estimated Value Copy Edit |
| Small TVs | Sony Bravia 25" 3D LCD | $400 | 19% | 5.0 | 15 | 6,122 | 0.08% | $27,916 | 0.14% | $48,854 | 0.16% | $55,833 | 0.17% | $59,322 |
| Small TVs | Samsung 22" 1080p LCD | $250 | 21% | 5.0 | 13 | 2,195 | 0.06% | $5,992 | 0.12% | $8,989 | 0.13% | $9,738 | 0.13% | $9,738 |
| Small TVs | LG 23" 1080p LCD | $300 | 18% | 5.0 | 13 | 912 | 0.07% | $2,241 | 0.10% | $3,201 | 0.12% | $3,841 | 0.12% | $3,841 |
| Small TVs | Dynex 19" 1080p LCD | $200 | 17% | 3.0 | 10 | 599 | 0.06% | $367 | 0.08% | $611 | 0.11% | $672 | 0.12% | $733 |
| Small TVs | Dynex 15" 720p LCD | $150 | 11% | 2.0 | 8 | 275 | 0.06% | $44 | 0.08% | $58 | 0.10% | $73 | 0.11% | $80 |

FIG. 16B

| | | 1631 | 1632 | 1633 | 1634 | 1635 | 1620 | 1637 | 1638 | 1639 | 1622 | 1641 | 1642 | 1643 | 1624 | 1645 | 1646 | 1647 | 1648 |
|---|---|---|---|---|---|---|---|---|---|---|---|---|---|---|---|---|---|---|---|
| Contribution ROI Hurdle Rate | 300% | | | | | | | | | | | | | | | | | | |
| 1630 Category | Item | Estimated Value No Translation | Cost of No Translation | Contribution Margin of No Translation | Contribution ROI of No Translation | Estimated Value Machine Translation | Cost of Machine Translation | Contribution Margin of Machine Translation | Contribution ROI of Machine Translation | Estimated Value Human Translation | Cost of Human Translation | Contribution Margin of Human Translation | Contribution ROI of Human Translation | Estimated Value Copy Edit | Cost of Copy Edit | Contribution Margin of Copy Edit | Contribution ROI of Copy Edit | Optimum Localization Source |
| Small TVs | Sony Bravia 25" 3D LCD | $27,916 | $0.30 | $ 27,916 | 9305340% | $48,854 | $15.00 | $ 48,839 | 325590% | $55,833 | $75.00 | $ 55,758 | 74344% | $59,322 | $150.00 | $ 59,172 | 39448% | Copy Edit |
| Small TVs | Samsung 22" 1080p LCD | $5,992 | $0.40 | $ 5,992 | 1497968% | $8,989 | $20.00 | $ 8,969 | 44843% | $9,738 | $100.00 | $ 9,638 | 9638% | $9,738 | $200.00 | $ 9,538 | 4769% | Human Translation |
| Small TVs | LG 23" 1080p LCD | $2,241 | $0.44 | $ 2,240 | 509169% | $3,201 | $22.00 | $ 3,179 | 14451% | $3,841 | $110.00 | $ 3,731 | 3392% | $3,841 | $220.00 | $ 3,621 | 1646% | Human Translation |
| Small TVs | Dynex 19" 1080p LCD | $367 | $0.42 | $ 366 | 87183% | $611 | $21.00 | $ 590 | 2809% | $672 | $105.00 | $ 567 | 540% | $733 | $210.00 | $ 523 | 249% | Machine Translation |
| Small TVs | Dynex 15" 720p LCD | $44 | $0.43 | $ 43 | 10030% | $58 | $21.50 | $ 37 | 170% | $73 | $107.50 | $ (35) | -32% | $80 | $215.00 | $ (135) | -63% | No Translation |

| 1710 | | 1711 | 1712 | 1713 | 1714 | 1715 | 1716 | 1717 | 1718 | 1719 | 1720 |
|---|---|---|---|---|---|---|---|---|---|---|---|
| Category | Item | | Initial Localization Source | Promoted Localization Source | Cost of Initial Source | Contribution Margin of Initial Source | Cost of Promoted Source | Contribution Margin of Promoted Source | Incremental Cost of Promotion | Incremental Contribution Margin of Promotion | Incremental Contribution ROI of Promotion |
| Small TVs | Sony Bravia 25" 3D LCD | No Trans | Machine | $0.30 | $ 27,916 | $15.00 | $ 48,839 | $14.70 | $ 20,923 | 142330% |
| Small TVs | Sony Bravia 25" 3D LCD | No Trans | Human | $0.30 | $ 27,916 | $75.00 | $ 55,758 | $74.70 | $ 27,842 | 37271% |
| Small TVs | Sony Bravia 25" 3D LCD | No Trans | Copy Edit | $0.30 | $ 27,916 | $150.00 | $ 59,172 | $149.70 | $ 31,256 | 20879% |
| Small TVs | Sony Bravia 25" 3D LCD | Machine | Human | $15.00 | $ 48,839 | $75.00 | $ 55,758 | $60.00 | $ 6,919 | 11532% |
| Small TVs | Sony Bravia 25" 3D LCD | Machine | Copy Edit | $15.00 | $ 48,839 | $150.00 | $ 59,172 | $135.00 | $ 10,334 | 7655% |
| Small TVs | Sony Bravia 25" 3D LCD | Human | Copy Edit | $75.00 | $ 55,758 | $150.00 | $ 59,172 | $75.00 | $ 3,415 | 4553% |
| Small TVs | Samsung 22" 1080p LCD | No Trans | Machine | $0.40 | $ 5,992 | $20.00 | $ 8,969 | $19.60 | $ 2,977 | 15187% |
| Small TVs | Samsung 22" 1080p LCD | No Trans | Human | $0.40 | $ 5,992 | $100.00 | $ 9,638 | $99.60 | $ 3,646 | 3660% |
| Small TVs | Samsung 22" 1080p LCD | No Trans | Copy Edit | $0.40 | $ 5,992 | $200.00 | $ 9,638 | $199.60 | $ 3,546 | 1776% |
| Small TVs | Samsung 22" 1080p LCD | Machine | Human | $20.00 | $ 8,969 | $100.00 | $ 9,638 | $80.00 | $ 669 | 836% |
| Small TVs | Samsung 22" 1080p LCD | Machine | Copy Edit | $20.00 | $ 8,969 | $200.00 | $ 9,538 | $180.00 | $ 569 | 316% |
| Small TVs | Samsung 22" 1080p LCD | Human | Copy Edit | $100.00 | $ 9,638 | $200.00 | $ 9,538 | $100.00 | $ (100) | -100% |
| Small TVs | LG 23" 1080p LCD | No Trans | Machine | $0.44 | $ 2,240 | $22.00 | $ 3,179 | $21.56 | $ 939 | 4354% |
| Small TVs | LG 23" 1080p LCD | No Trans | Human | $0.44 | $ 2,240 | $110.00 | $ 3,731 | $109.56 | $ 1,491 | 1361% |
| Small TVs | LG 23" 1080p LCD | No Trans | Copy Edit | $0.44 | $ 2,240 | $220.00 | $ 3,621 | $219.56 | $ 1,381 | 629% |
| Small TVs | LG 23" 1080p LCD | Machine | Human | $22.00 | $ 3,179 | $110.00 | $ 3,731 | $88.00 | $ 552 | 628% |
| Small TVs | LG 23" 1080p LCD | Machine | Copy Edit | $22.00 | $ 3,179 | $220.00 | $ 3,621 | $198.00 | $ 442 | 223% |
| Small TVs | LG 23" 1080p LCD | Human | Copy Edit | $110.00 | $ 3,731 | $220.00 | $ 3,621 | $110.00 | $ (110) | -100% |
| Small TVs | Dynex 15" 720p LCD | No Trans | Machine | $0.43 | $ 43 | $21.50 | $ 37 | $21.07 | $ (7) | -31% |
| Small TVs | Dynex 15" 720p LCD | No Trans | Human | $0.43 | $ 43 | $107.50 | $ (35) | $107.07 | $ (78) | -73% |
| Small TVs | Dynex 15" 720p LCD | No Trans | Copy Edit | $0.43 | $ 43 | $215.00 | $ (135) | $214.57 | $ (178) | -83% |
| Small TVs | Dynex 15" 720p LCD | Machine | Human | $21.50 | $ 37 | $107.50 | $ (35) | $86.00 | $ (71) | -83% |
| Small TVs | Dynex 15" 720p LCD | Machine | Copy Edit | $21.50 | $ 37 | $215.00 | $ (135) | $193.50 | $ (172) | -89% |
| Small TVs | Dynex 15" 720p LCD | Human | Copy Edit | $107.50 | $ (35) | $215.00 | $ (135) | $107.50 | $ (100) | -93% |

| Category | Item | Initial Source | Cost | Contribution Margin |
|---|---|---|---|---|
| Small TVs | Sony Bravia 25" 3D LCD | No Trans | $0.30 | $ 27,916 |
| Small TVs | Samsung 22" 1080p LCD | No Trans | $0.40 | $ 5,992 |
| Small TVs | LG 23" 1080p LCD | No Trans | $0.44 | $ 2,240 |
| Small TVs | Dynex 19" 1080p LCD | No Trans | $0.42 | $ 366 |
| 1765 -> | | Subtotal | $1.56 | $36,514.48 |
| 1766 -> | | Fixed Cost | $0.00 | |
| 1767 -> | | Total | $1.56 | $36,514.48 |

FIG. 17D

| Category | Item | Final Source | Cost | Contribution Margin | Contribution ROI |
|---|---|---|---|---|---|
| Small TVs | Sony Bravia 25" 3D LCD | Copy Edit | $150.00 | $ 59,172 | 39448% |
| Small TVs | Samsung 22" 1080p LCD | Machine | $20.00 | $ 8,969 | 44843% |
| Small TVs | LG 23" 1080p LCD | Machine | $22.00 | $ 3,179 | 14451% |
| Small TVs | Dynex 19" 1080p LCD | No Trans | $0.42 | $ 366 | 87183% |
| 1776 -> | | Total | $192.42 | $71,685.99 | |

| | 1810 | 1811 | 1812 | 1813 | 1814 | 1815 | 1816 | 1817 | 1818 | 1819 |
|---|---|---|---|---|---|---|---|---|---|---|
| Category | | Cost for No Translation | Value from No Translation | Contribution Margin from No Translation | Cost for Machine Translation | Value from Machine Translation | Contribution Margin from Machine Translation | Cost for Human Translation | Value from Human Translation | Contribution Margin from Human Translation |
| Small TVs | | $0.00 | $0.00 | $0.00 | $2,000 | $5,000 | $3,000 | $6,000 | $12,000 | $6,000 |
| Large TVs | | $0.00 | $0.00 | $0.00 | $1,000 | $4,000 | $3,000 | $3,000 | $9,000 | $6,000 |

FIG. 18A

| | 1820 | 1821 | 1822 | 1823 | 1824 | 1825 | 1826 | 1827 | 1828 | 1829 |
|---|---|---|---|---|---|---|---|---|---|---|
| Category | | Initial Localization Source | Promoted Localization Source | Cost of Initial Source | Contribution Margin of Initial Source | Cost of Promoted Source | Contribution Margin of Promoted Source | Incremental Cost of Promotion | Incremental Contribution Margin of Promotion | Incremental Contribution ROI of Promotion |
| Small TVs | | No Trans | Machine | $0.00 | $0.00 | $2,000 | $3,000 | $2,000 | $3,000 | 150% |
| Small TVs | | No Trans | Human | $0.00 | $0.00 | $6,000 | $6,000 | $6,000 | $6,000 | 100% |
| Small TVs | | Machine | Human | $2,000 | $3,000 | $6,000 | $6,000 | $4,000 | $3,000 | 75% |
| Large TVs | | No Trans | Machine | $0.00 | $0.00 | $1,000 | $3,000 | $1,000 | $3,000 | 300% |
| Large TVs | | No Trans | Human | $0.00 | $0.00 | $3,000 | $6,000 | $3,000 | $6,000 | 200% |
| Large TVs | | Machine | Human | $1,000 | $3,000 | $3,000 | $6,000 | $2,000 | $3,000 | 150% |

FIG. 18B

| | 1910 | 1911 | 1912 | 1913 | 1914 | 1915 | 1916 | 1917 | 1918 | 1919 |
|---|---|---|---|---|---|---|---|---|---|---|
| Category | | Initial Localization Source | Promoted Localization Source | Cost of Initial Source | Contribution Margin of Initial Source | Cost of Promoted Source | Contribution Margin of Promoted Source | Incremental Cost of Promotion | Incremental Contribution Margin of Promotion | Incremental Contribution ROI of Promotion |
| Large TVs | | No Trans | Machine | $0.00 | $0.00 | $1,000 | $3,000 | $1,000 | $3,000 | 300% |
| Large TVs | | No Trans | Human | $0.00 | $0.00 | $3,000 | $6,000 | $3,000 | $6,000 | 200% |
| Small TVs | | No Trans | Machine | $0.00 | $1,000.00 | $2,000 | $3,000 | $2,000 | $3,000 | 150% |
| Large TVs | | Machine | Human | $1,000 | $6,000 | $3,000 | $6,000 | $2,000 | $3,000 | 150% |
| Small TVs | | No Trans | Human | $0.00 | $0.00 | $6,000 | $6,000 | $6,000 | $6,000 | 100% |
| Small TVs | | Machine | Human | $2,000 | $0 | $6,000 | $6,000 | $4,000 | $3,000 | 75% |

DYNAMIC DETERMINATION OF LOCALIZATION SOURCE FOR WEB SITE CONTENT

TECHNICAL FIELD

The present teaching generally relates to the Internet, and more particularly relates to localization of Internet content.

BACKGROUND

The Internet and the world-wide web have allowed consumers to complete business transactions with organizations or individuals located across continents. In an increasingly global marketplace, it is becoming imperative for businesses/organizations to localize their websites for visitors in other markets in order to expand their customer base.

Local relevance is the degree to which a website contains content and functionality that is useful to people within a local market. Factors that determine a website's local relevance include the language of the website, units of measure used on the site, relevant marketing offers, relevant imagery, the currency used to denominate the products and services offered on the site, conventions used to format different types of data (for instance dates and monetary amounts), the particular products and services offered on the site, payment types that can be used to transact on the site, shipping methods used to deliver products to customers, local market regulatory compliance (such as duties & tariffs, privacy policies, etc.) and access to local customer service.

Traditionally, much of the cost of localizing a website is incurred by website owners prior to local visitors using the site and generating a return for the owners of the site. Knowing what to localize and how to do it can be very difficult. The incremental return from localization is hard to estimate. Traditionally, the ongoing cost of localizing is also difficult to estimate. The ultimate size of a market in a locale and the pace with which it will grow are difficult for companies to predict. All of these factors make it difficult to determine or budget the amount of investment needed in the localization of a website.

An organization's profit potential in each local market is usually a function of market-specific factors such as population, GDP, maturity of the industry, competition, shipping costs, tax rates, etc. and often changes over time. Because of this, each organization may make a localization decision based on an assessment as to whether the localization will enhance the profitability in each particular locale. In addition, different web pages of a website may or often likely have different potential to drive up the profits. For example, a job posting page of a company is unlikely to directly contribute to profitability. At the same time, a page posting products for sale, which allows a user to make a purchase on that page, is more likely to play a role to enhance the profitability. Given that, different web pages of a website have different priorities in terms of localization. Furthermore, the potential of each page, or even portions of a single page, to drive the profitability likely changes over time. For example, the popularities of products that are displayed on different web pages (or different portions of a single page) may change from locale to locale or over time. In this case, ideally, the localization decision with respect to a particular locale should adapt according to such changes or dynamics in the local market. Traditional localization approaches do not consider such factors and do not offer any solution for such needs.

There is another dimension to localization. When translating a website to another language in order to localize it for a specific market, an organization can choose from several localization sources, which can include machine translation, human edited machine translation, human translation and copy writing. Machine translation is inexpensive, but the quality is inferior to human translation. The editing of machine translation by a human improves the quality of the machine translation at a higher cost than machine translation alone, but because the starting point can be a poor translation, the end result is typically inferior to human translation. Human translation is more expensive than the machine or human edited machine methods, yet results are in general of a superior quality. However, even with human translation, there are vastly different cost structures and associated quality of translations. Professional human translators typically cost more and produce higher quality translations than volunteers or crowd sourced translations. Also, a copy writer goes beyond translation by conveying different and ideally more relevant messages to the website visitors, but it is typically the most expensive approach.

The value derived from localizing a website is a function of factors such as how many visitors will see it, how likely visitors are to "transact" as a result of the localization, how much value a "transaction" generates, and how much the localization costs. Typically, an organization will choose one of the above localization sources and apply it to the entire website without taking into consideration the fact that different areas of the website, or different pages of the website, or even different areas of a single page, may give rise to different levels of significance in terms of potential financial return to the organization. Organizations rarely revisit their decisions in localization, as circumstances change, nor do they consider the full range of localization sources. This consequently impacts the value they can derive from localization. An important reason that organizations do not do that is because there is no efficient approach, system, or tool to efficiently and dynamically allocate localization sources to a website.

The type of localization source used will generate varying degrees of online engagement and conversion rates (i.e., the percentage of website visitors who take a desired action). In addition, different areas or pieces of content within the website have varying levels of importance for localization. For instance, high visibility content and areas containing a call-to-action typically generate greater return on localization investment than other areas. As a result, applying a one-size-fits-all approach for the entire website is not the most efficient or effective approach because it results in organizations over-investing in localizing less important content while under-investing in localizing more important content.

Therefore a need exists to overcome the problems with the prior art as discussed above.

SUMMARY

The methods, systems, and/or programming described herein are related to content localization and particularly related to determining content localization sources for content.

In one example, a method implemented on a computer having at least one processor, storage, and communication platform for localizing an element present in a piece of content comprising a plurality of elements is disclosed. A cost of localizing an element with respect to each of one or more localization sources is first computed. At least one criterion based on which a localization source for localizing the element is to be determined is obtained. A localization source for localizing the element is then selected based on an assessment with respect to the at least one criterion. The element of the content is then localized using the selected localization source.

In a different example, a method implemented on a computer having at least one processor, storage, and communication platform for determining a localization source for localizing a plurality of elements present in a piece of content is disclosed. A cost of localizing each of the elements in the content with respect to each of one or more localization sources is first computed. At least one criterion with respect to each element based on which a localization source for localizing the element is to be determined is obtained. A localization source for localizing each of the elements in the content is then selected based on the at least one criterion associated with the element. Each of the elements in the content is then localized using its respectively selected localization source. One or more measures for each element are monitored and such measures are computed with respect to the at least one criterion corresponding to the element. Based on such monitored one or more parameters with respect to each element, an updated localization source for the element is dynamically determined. Then each of the elements is localized based on its corresponding update localization source.

In another example, a method implemented on a computer having at least one processor, storage, and communication platform for localizing an element present in a piece of content having multiple elements is disclosed. A cost of localizing an element with respect to one or more localization sources is first computed. An initial localization source for localizing the element is selected based on at least one criterion and the initial localization source is used to localize the element. One or more measures are monitored where the one or more measures are computed with respect to the at least one criterion. Based on such monitored one or more parameters with respect to the element, an updated localization source for the element is automatically determined. Then the element is localized based on its corresponding update localization source.

In yet another example, a method implemented on a computer having at least one processor, storage, and communication platform for localizing an element present in a piece of content having multiple elements is disclosed. A cost of localizing an element with respect to one or more localization sources is first computed. An initial localization source for localizing the element is selected based on at least one criterion and the initial localization source is used to localize the element. One or more measures are monitored where the one or more measures are computed with respect to the at least one criterion. An adjustment to the initial localization source is determined based on the one or more measures. Such an adjustment to the initial localization source is determined based on the one or more measures. Such an adjustment includes either promotion or demotion.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a drawing that shows a product information page with 2 elements;

FIG. 4A shows an exemplary table that provides an example list of small televisions for sale on an online retailer's website;

FIG. 4B shows an exemplary table that provides another example list of small televisions for sale on an online retailer's website;

FIG. 5A is a table that shows an example of estimating the value of a list of new articles present on an ad supported portal or news website;

FIG. 5B is a table that shows an example of estimating the value of the content of several products on a shopping engine's website.

FIG. 6 contains an exemplary table that shows the cost of localizing a detailed product description element using different localization sources;

FIG. 10A is an exemplary table that shows localization source promotion decisions by TV based on traffic and visitor behavior during a period of 30 days for the list of televisions shown in FIGS. 4A and 4B;

FIG. 10B shows an exemplary computed contribution margin for machine translation based on the table shown in FIG. 10A;

FIG. 12A is a table that shows the results of an example test performed during a period of 30 days for a representative sample of televisions for both human and machine translation localization sources and determines an optimized localization source for each TV based on the results;

FIG. 12B shows an exemplary computed contribution margin for machine translation and an exemplary computed contribution margin for human translation based on the table shown in FIG. 12A;

FIG. 13A is a table that shows the results of an example test performed during a period of 30 days for a representative sample of televisions for both human and machine translation localization sources and determines an optimum category-wide localization source based on the results;

FIG. 13B shows an exemplary computed contribution margin for machine translation and an exemplary computed contribution margin for human translation based on the table shown in FIG. 13A;

FIG. 15A is an exemplary table that shows localization source promotion decisions by TV based on traffic and visitor behavior during a period of 30 days and on category specific conversion lift percentages by localization source for the list of televisions shown in FIGS. 4A and 4B;

FIG. 15B shows an exemplary computed contribution margin for no localization based on the table shown in FIG. 15A;

FIG. 16A is a table that shows the results of an example test performed during a period of 30 days for a representative sample of televisions for various localization sources and determines an optimum localization source for each TV based on how the test results impact return on investment;

FIG. 16B shows an exemplary computed contribution margin for no translation based on the table shown in FIG. 16A;

FIG. 17A is a table that shows the result of an exemplary test on determining the optimum localization source for individual elements via successive localization source promotions while simultaneously considering other factors;

FIG. 17B shows an exemplary scheme for maximizing profit across multiple products;

FIG. 17C shows an initial state before applying the scheme shown in FIG. 17B;

FIG. 17D shows final localization sources and other features based on the scheme shown in FIG. 17B;

FIG. 18A shows more test results determining a localization source for each category while simultaneously considering various factors;

FIG. 18B shows the associated investment decisions and other features in accordance with the results in FIG. 18A;

FIG. 19A shows another test result determining a localization source for groups of content while simultaneously considering multiple factors;

FIG. 20 shows more example test results relating to gradually localizing groups of content within a budget constraint while adapting to the discrepancy between a predicted and the actual amount of content to be localized;

DETAILED DESCRIPTION

Figure 1:
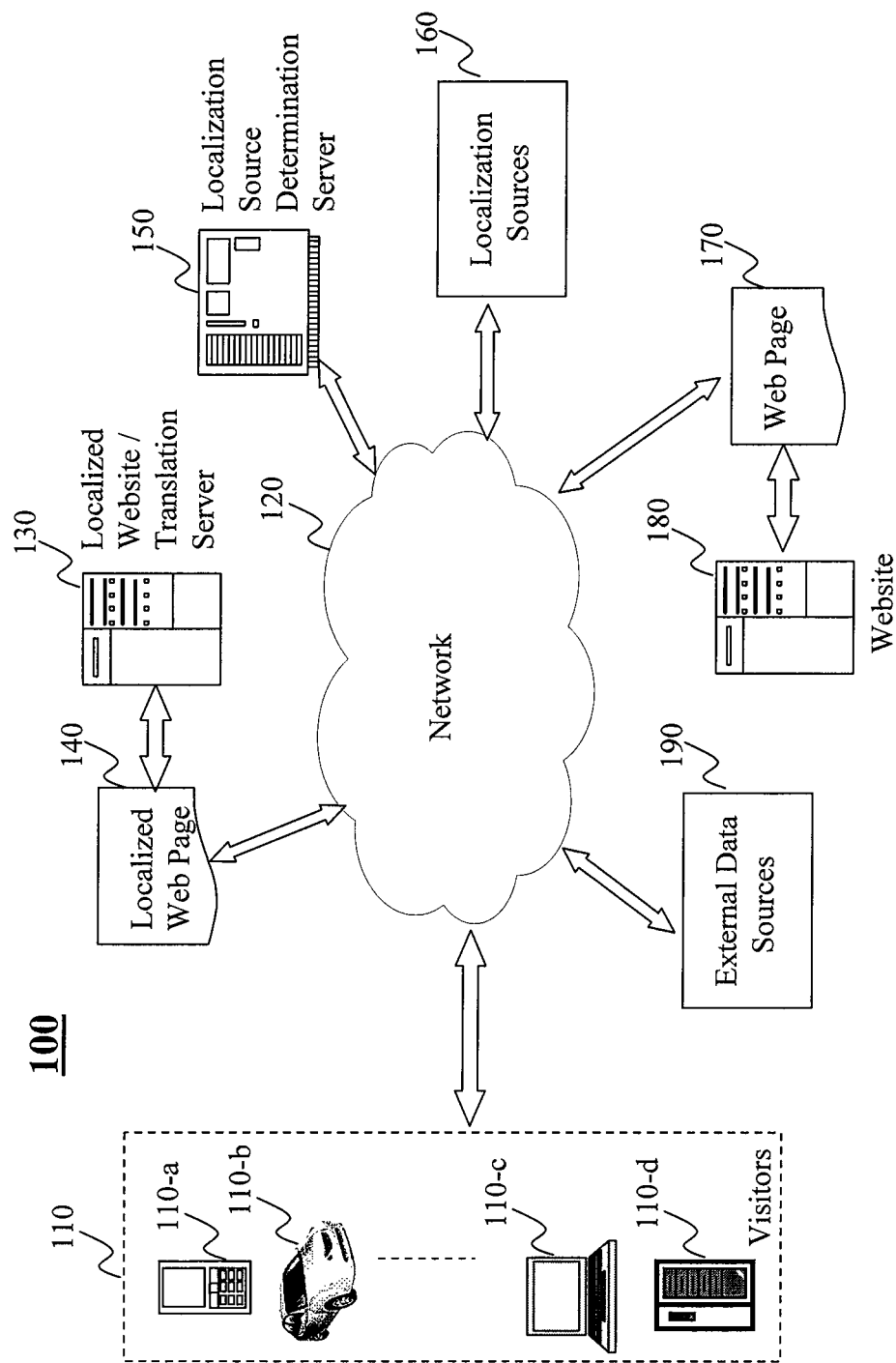
FIG. 1 is a block diagram illustrating the overall architecture of the present teaching by showing its relationship to a website, the localized version of the website and online visitors, in one embodiment of the present invention.

All organizations have limited resources (e.g., budget limitations), which makes it important to invest such limited resources in ways that generate maximum return. Therefore, it is important to determine a most suitable localization source for each particular area or piece of content in a web site in order to maximize the return on investment and the profit generated by the localized website. As discussed above, to date, there is no effective approach, system, or tool that enables organizations to do so. The present teaching provides methods and systems that facilitate organizations to individually localize different portions of a website (be it different pages or areas of the same page) using individually selected localization sources based on criteria, such as profit maximization, and to adjust the same dynamically over time to adapt to the changing surrounding dynamics to allow organizations to balance smartly the cost of localization and the return from the localization. The automated selection of a localization source may be optimized based on criteria specific to each organization so that the automatically selected localization source may correspond to an optimum localization source with respect to the criterion provided.

The present teaching involves individually localizing the content of different elements contained in web pages, web sites, documents, etc. The disclosed teaching is capable of automatically determining a localization source for the content of each element in, e.g., a web page, a web site, or a document, and automatically routing the content to the selected localization source. It also provides the capability of adjusting, dynamically, the localization sources to be used to localize the content of individual elements. Such dynamic adjustment may be made based on the surrounding circumstances such as market dynamics, ongoing viewership or economic return, which may be measured, e.g., with respect to the investment put in the localization of each element. Based on such monitored surrounding circumstances, the present teaching is capable of automatically adjusting from one localization source to another for, e.g., each of the elements in the content. The present teaching is also capable of making dynamic adjustments based on, e.g., a specified condition. For example, a selectable criterion that can be used to control the dynamic adjustment of localization of content of individual elements may be specified as, e.g., promote, demote, or no-changes. For example, based on the economic return, the present teaching may promote (or demote) a localization source to another higher cost/quality (or lower cost/quality) localization source. The automatic determination, adjustment, and routing to localization sources is done dynamically and can be without human intervention, particularly when the system is configured to run in real time. The disclosed system can also be configured to allow human intervention, e.g., when human intervention is needed, e.g., administrators need to confirm machine automatically generated decisions related to localization sources or approve the cost for localization. The system can be configured to allow a human to participate in making confirmations as to a decision or iteratively interface with the system to adjust the process of making decisions related to localization sources. For example, when the budgetary situation changes, a manager may be allowed to specify different operational parameters such as the budget so that the system can compute the optimal localization sources based on such newly specified parameters.

It is often the case that not every element in content, e.g., a web page, carries the same importance or potential to drive up value. It follows that not every element of the content needs to be localized using the same localization quality (or source). No mechanism or method to date is able to individually localize the content of different elements based on an estimated cost versus benefit, using individually determined localization sources. In addition, to ensure that localization of the content is cost effective, no mechanism or method to date is capable of individually monitoring the economic return with respect to the content of each element and dynamically adjusting the localization source to be used.

The methods, systems, and medium, disclosed in accordance with the present teaching, overcome problems with the prior art by providing dynamic determination of a localization source individually for different portions of content. Such determined localization source may be deemed as optimum in connection with certain criteria.

FIG. 1 depicts a block diagram illustrating an exemplary overall architecture of the present teaching showing its relationship to a website, the localized version of the website and online visitors, in one embodiment of the present invention. An origin website 180 produces a web page 170 for a home market. The origin website 180 is connected to a network 120, such as the Internet, through which visitors 110 request and receive the web pages 170. A localized version of the website 130 returns to visitors localized versions of web pages 140 corresponding to the web pages of the origin website 170. The localized website 130 can be implemented via a Translation or Localization Server, such as the one described in U.S. Pat. Nos. 7,580,960, 7,582,216, 7,627,479, 7,627,817, 7,996,417, and 8,065,294, as well as pending U.S. pending patent applications with Ser. Nos. 13/096,464, 12/609,778, and 12/609,834, all assigned to the same assignee. The localized website 130 is also coupled to a network, e.g., the same network 120 as the origin website 180. Various types of public visitors 110, such as users using mobile devices 110-a, vehicle devices 110-b, laptops or tablets 110-c, and desktop computers 110-d, request and receive web pages 170 and localized web pages 140 via the network 120. A server 150 dynamically and automatically determines the localization sources, e.g., optimal sources with respect to different organization-based criteria, and routes content to such determined localization sources, which are also coupled to network 120, such as various available localizations sources 160. The server 150 may use additional information from external sources 190, also connected to the network 120, in the process of determining the localization sources. An example of such additional information includes market information.

Although FIG. 1 refers to a website and a localized website, the methods, systems, and medium, disclosed in accordance with the present teaching may be applied to other types of servers (not just web servers) and applications. For example, these teachings can be applied to online mobile applications that have a server and a client component. The client component, typically referred to as a mobile app, is installed on the mobile device. The server component is installed on a server and communicates with the client component via the network 120. An example of a server component is a web service.

A common goal of a website is to trigger specific behaviors from its online visitors. For example, the primary goal of an online retailer's website is for its visitors to purchase items on the site. The value of the website is driven by the behaviors it promotes. Some example behaviors include: buying, consuming content, locating a dealer, locating a store, requesting a quote, subscribing to a list, requesting more information, downloading a file, paying a bill, etc. The percentage of visitors who achieve a desired behavior is also known as the percentage conversion.

Figure 2:
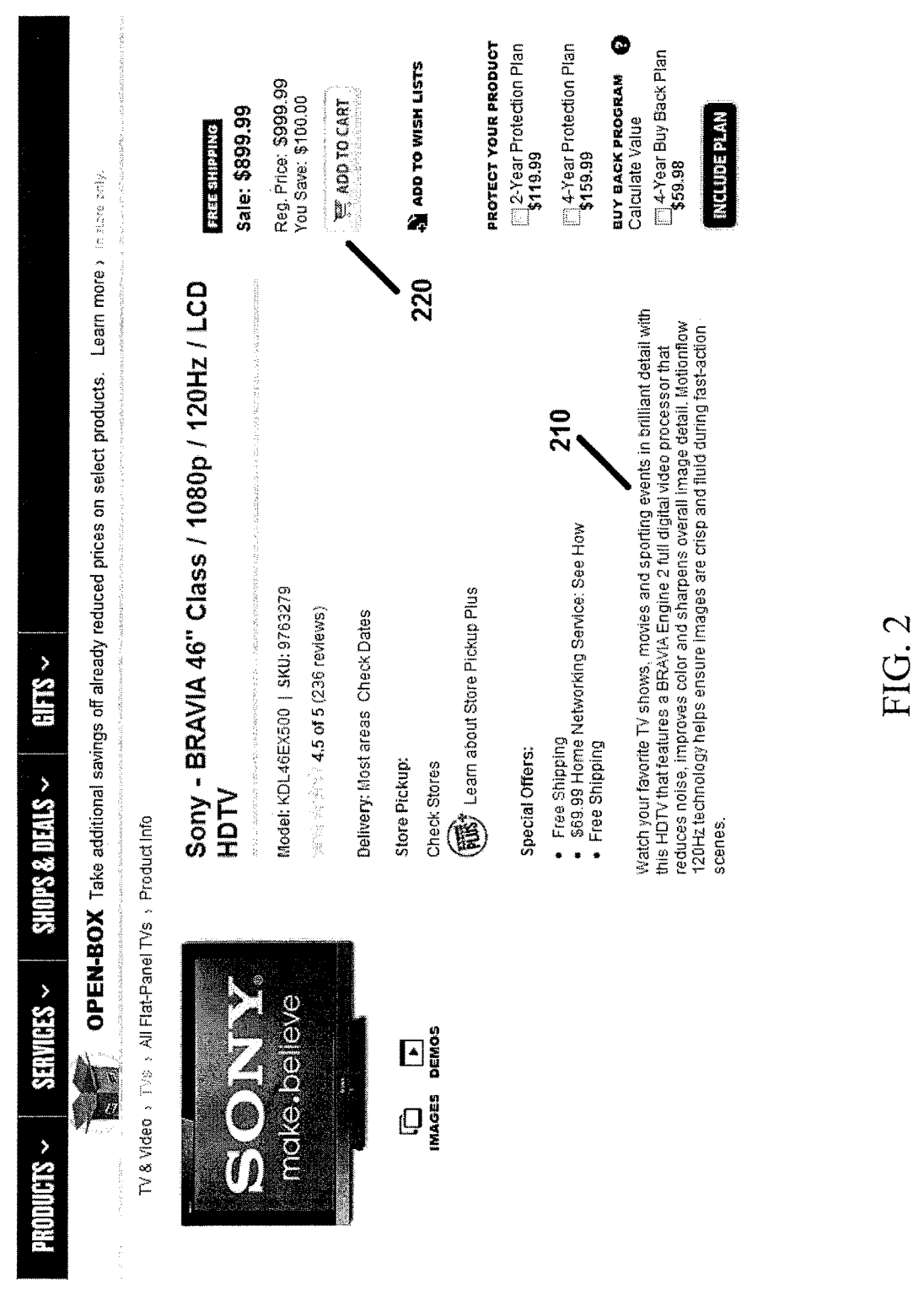

For the purpose of this teaching, a website comprises elements that contain content to be displayed. An example of an element is a product information page on an online retailer's website. An element of a website may also comprise multiple pages, such as a checkout application. It may also be a subset of the content in a web page, such as a detailed product description, or a single image or button, such as an "add to cart" button. FIG. 2 is a drawing that shows an exemplary product information page with 2 elements: a detailed product description 210 and an "add to cart" button 220. The set of content that the detailed product description element 210 contains comprises the descriptions of each of the products available for sale on the online retailer's website.

Elements that are important to a website are usually associated with or intended to trigger specific behaviors. For example, an "add to cart" button is associated with a buy behavior. A detailed product description may also trigger buy behavior. The commercial value of an element is directly related to the behavior associated therewith. The process of estimating the value of an element depends on the type of content that it contains. For example, the value of a product information page element for a specific product may be based on various considerations, such as the retail price of the product, the percentage gross margin on the sale of the product, the estimated number of visitors that will see that page and the rate at which these visitors will purchase the product. In contrast, the value of a "Locate Dealer" submission element on a manufacturer site may be based on the amount a dealer would pay for access to that lead or the rate at which that lead later buys a product or service. The value of a visit to a site which lacks a call to action that can be translated into a value can be also quantified. For example, the value of such a visit might be based on a post-visit survey regarding future purchase intent, post-visit brand impression, or even deferred purchase behavior.

Figure 3:
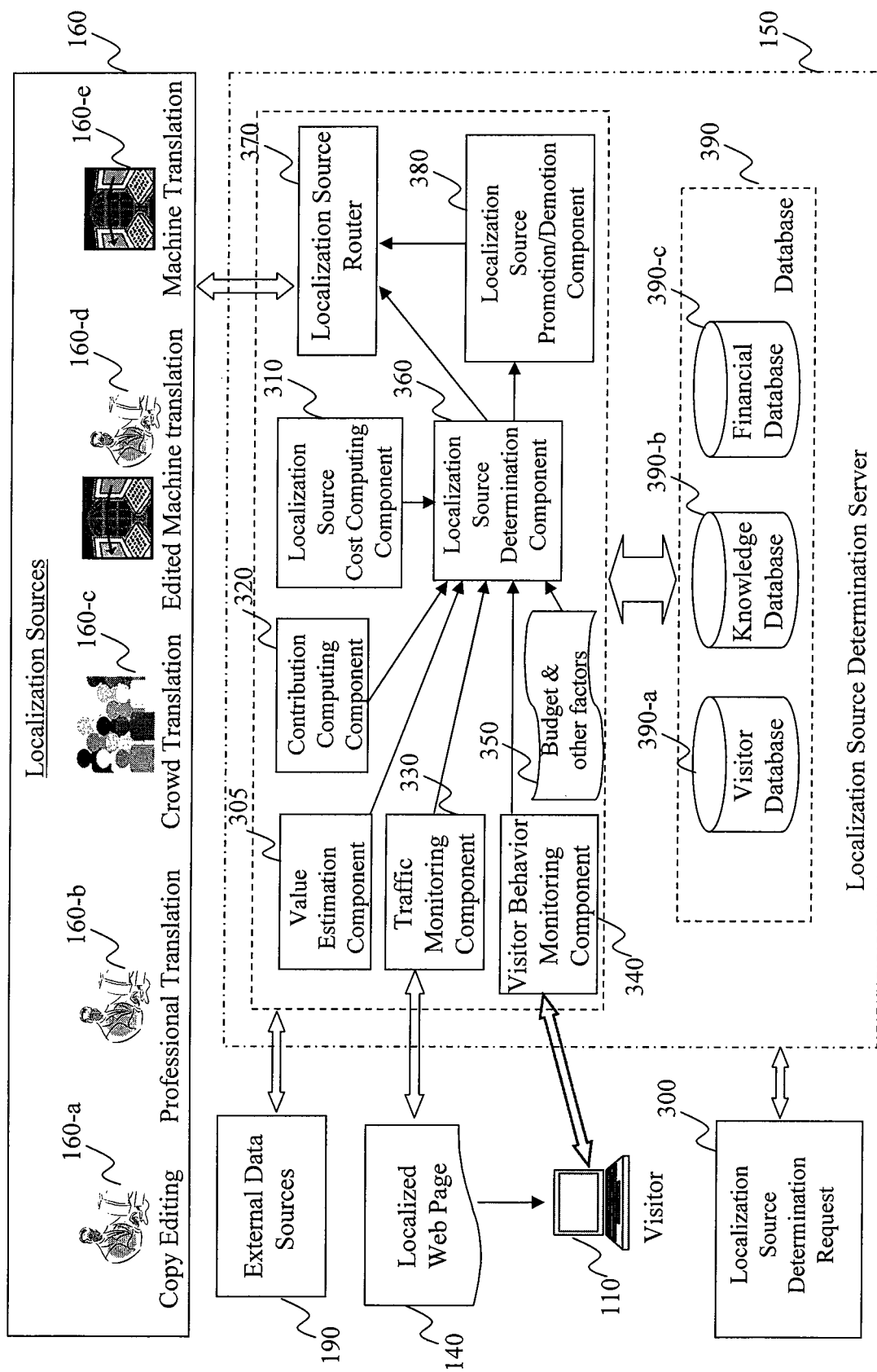
FIG. 3 is a block diagram illustrating the system architecture of the present invention, in one embodiment of the present invention.

FIG. 3 is a block diagram illustrating one embodiment of the system architecture of the present invention. Localization source determination server 150 depicts an exemplary architecture of the component that automatically determines the localization sources depicted in FIG. 1 and routes content to such optimum localization sources. Various types of localization sources 160 may be available, such as Copy Editing 160-a, Professional Translation 160-b, Crowd Translation 160-c, Human-edited Machine Translation 160-d and Machine Translation 160-e. The Localization Source Determination Request 300 represents a request from an outside entity, such as the Localized Website/Translation Server 130 of FIG. 1, to determine the optimum localization source for the content of an element, such as a detailed product description 210 shown in FIG. 2.

The Value Estimation Component 305 estimates the value of content of an element on the website 180, or on the localized website 130, based on, e.g., information present in the visitor 390-a, knowledge 390-b and financial 390-c databases. For example, in the case of the product description 210, such information can include the average sale price, gross margin percentage, item life in months, projected views per month, projected conversion percentage and a shop-online-buy-in-store factor for the actual television product for sale. The value of the product description 210 of a television can then be estimated based on this information. For example, a scheme for estimating the value of the television description can involve multiplying the average sale price, gross margin percentage, item life in months, projected views per month, projected conversion percentage and an in-store factor. Another example is advertisement (i.e., ad) supported content, such as news articles, in which case the information stored in the databases 390-a, 390-b and 390-c can include the average advertisement revenue per mille and the projected advertisement views for the lifetime of the articles. An exemplary scheme for estimating the value of the content of a specific news article involves multiplying the average ad revenue per mille by the projected ad views for the lifetime of the article. The Value Estimation Component 305 may store estimated values in the financial 390-c database for, e.g., its own future use, use by other components, and to maintain historical data. Such historical data may also be aggregated and categorized to help draw generalizations in the future.

The Localization Source Cost Computing Component 310 computes the cost of localizing the content of an element on the website 180 using the various localization sources 160 based on information present in the knowledge 390-b and financial 390-c databases. Such information can include the cost per word by localization source. For example, a scheme for computing the cost of localizing the product description 210 of FIG. 2 using professional (i.e., human) translation can involve multiplying the number of words in the description by the cost per word. The Localization Source Cost Computing Component 310 may store computed costs into the financial database 390-c for, e.g., its own future use, for use by other components and to maintain historical data. Such historical data may also be aggregated and categorized to help draw generalizations in the future.

The Contribution Computing Component 320 computes the contribution of the content of an element on the localized website 130 in relation to a localization source. Contribution is a metric that quantifies the impact of localizing the content of an element. Such impact is typically, but not necessarily, measured in terms of profitability, such as margin, or profitability in relation to cost, such as return on investment (ROI). The Contribution Computing Component 320 can use information present in the visitor 390-a, knowledge 390-b and financial 390-c databases, as well as information generated by the Localization Source Cost Computing Component 310 and Value Estimation Component 305. It can also obtain information from sources external to the system 150. For example, in the case of the product description 210 of FIG. 2, such information can include the cost of localizing product descriptions using the various localization sources 160 and the value of the product descriptions for the actual television products for sale. The contribution of the product description 210 of a television can then be computed based on this information. For example, a scheme for computing the contribution as a profit margin of a specific television description 210 with a human localization source can involve subtracting the cost of localizing the product description using human translation (e.g., as computed by the Localization Source Cost Computing Component 310) from the value of the television description (e.g., as estimated by the Value Estimation Component 305). The Contribution Computing Component 320 may store computed contributions into the financial database 390-c for, e.g., its own future use, for use by other components and to maintain historical data. Such historical data may also be aggregated and categorized to help draw generalizations in the future.

The Traffic Monitoring Component 330 may track the visitor traffic to the localized web content, gathering statistics and storing them in the Visitor Database 390-a. The Visitor Behavior Monitoring Component 340 monitors visitor behavior (e.g., purchase behavior) on the localized web content and stores statistics related to the behavior in the Visitor Database 390-a. For example, a scheme for tracking traffic to the product description 210 of FIG. 2 may involve counting the number of times visitors view the web page containing the product description. An exemplary scheme for tracking visitor behavior for the "add to cart" button 220 of FIG. 2 may involve counting the number of times visitors viewing the page actually click on the button and calculating a percentage conversion. Some tracked visitor data may have more relevance when determining a target localization source or making a localization source promotion decision and, as a result, may receive special treatment, by, e.g., being used as a filter or given a different weight. For example, visits from crawlers and other automated tools (e.g., as reported by the user-agent header) may be discarded when testing localizations sources. In another example, visitors with specific language preferences (e.g., as reported by the browser) or coming from specific locations (e.g., as reported by the visitor's IP address) may be more relevant, and therefore given greater weight than other visitors, when making a localization source promotion decision. The Traffic Monitoring Component 330 and Visitor Behavior Monitoring Component 340 may also analyze visitor traffic and visitor behavior statistics and store results of the analysis in the knowledge database 390-b for, e.g., its own future use, for use by other components and to maintain historical data. Such historical data may be aggregated and categorized to help draw generalizations in the future. The category based views per month, at 422 and category based conversion percentage at 423 of FIG. 4B are examples of categorized historical data that may be stored in the Visitor Database 390-a and used by the Value Estimation Component 305.

One or more of the outputs of the Value Estimation Component 305, Localization Source Cost Computing Component 310, Contribution Computing Component 320, Traffic Monitoring Component 330 and Visitor Behavior Monitoring Component 340, along with budgeting considerations and other factors 350, may be provided directly as inputs to the Localization Source Determination Component 360, and/or may be stored in the database 390 for use as inputs by the Localization Source Determination Component 360. The Localization Source Determination Component 360 determines the optimum localization source 160 based on, e.g., one or more schemes with respect to, e.g., one or more criteria that take into account various inputs. For example, a criterion to determine the more desirable localization source from two available localization sources (e.g., human and machine translation) for a specific television description 210 may be designed to select the localization source with the highest contribution profit margin. An example scheme to determine the localization source with the highest contribution profit margin may involve computing the contribution margin by subtracting the output of the Localization Source Cost Computing Component 310 from the output of the Value Estimation Component 305 for each of the two available localization sources and selecting the contribution margin with the highest value. Another exemplary criterion to determine a desired localization source for the content of an element may be designed to select a higher quality localization source (e.g., human translation) for content on web pages that receive more traffic and a lower quality localization source (e.g., machine translation) for content on web pages that receive less traffic.

An exemplary scheme to determine a desirable localization source for the content of an element between human and machine translation based on traffic may involve establishing a traffic threshold, based on the output of the Traffic Monitoring Component 330 to obtain, e.g., the amount of traffic received on each web page with the content, and selecting human translation for the content whose traffic meets or exceeds the threshold and machine translation for all the other content of the element. The criterion and scheme for determining a desirable localization source may also use a combination of inputs and factors. For example, it may involve selecting the localization source with the highest contribution profit margin that clears a minimum contribution return on investment hurdle and that has minimum traffic (e.g., visitor views) threshold.

The External Data Sources 190 represents any data external to the system 150. Any of the components of FIG. 3 (e.g., the Value Estimation Component 305, Localization Source Cost Computing Component 310, Contribution Computing Component 320, Localization Source Determination Component 360, etc.) may use data from external sources as additional inputs when performing their functions. The external data source may or may not be a third party service. For example, the Value Estimation Component 305 may obtain data from a market trends service to determine the popularity and expected item life for a new product for which such data does not exist in the database 390. Another example of an external data source is an analytics server, which could provide, for example, additional aggregated user information (e.g., the percentage of users with a Chinese language preference that are located in the United States). The external data source may also be information available in an external database. For example, a website 180 owner may have a database containing product and/or sales information, such as the average sale price and gross margin percentage of products for sale on the website, which could be used by the Value Estimation Component 305 when estimating the value of such products. Such external information may be used to reflect the dynamics of the products in the marketplace so that such information may be used by the teaching disclosed herein to learn and adapt the localization to the changing dynamics of the market.

The Localization Source Determination Component 360 automatically directs the Localization Source Router 370 to route the translation of the content to the automatically selected localization source. The Localization Source Determination Component 360 may also direct the Localization Source Promotion/Demotion Component 380 to automatically promote or demote one localization source to another. The Localization Source Promotion/Demotion Component 380 in turn directs the Localization Source Router 370 to route translation to the new localization source 160. The Localization Source Determination Component 360 may also store decision information in the knowledge database 390-b for, e.g., its own future use, for use by other components and to maintain historical data. Such historical data may also be aggregated and categorized to help draw generalizations in the future.

It is important to note that the present teaching may be implemented using embodiments other than those of FIGS. 1 and 3. For example, the localization source determination server 150 that determines the desired localization sources may not be implemented as a separate server and may be instead integrated with the localized website 130 of FIG. 1. The functions of server 150 may also be split among multiple servers, each of which may perform a specialized function. For example, the traffic monitoring and visitor behavior components may be implemented in a separate analytics server.

The present teachings may be applied at the element level. Elements within a web site 130 or 180 are handled or processed independently of each other. Referring to the product information page depicted in FIG. 2, determination of, and routing to, an automatically selected localization source may be applied individually to the detailed product description element 210 and to the "add to cart" button element 220, even though both elements are in the same page. As a result, traffic monitoring, visitor behavior monitoring, value estimation, cost computation, contribution computation, localization source determination, localization source promotion/demotion and localization source routing may be performed individually and independently on elements 210 and 220. The traffic and visitor behavior monitoring schemes and the data monitored may be different for the detailed product description element 210 than for the "add to cart" button element 220. In addition, elements 210 and 220 may be dynamically configured to associate with different value estimation, cost computation and contribution computation schemes. The criterion and scheme for determining a desired localization source may also be different for these 2 elements, and, as a result, the selected localization source may be different. For example, the selected localization source for the detailed product description element 210 may be determined to be machine translation, while the selected localization source for the "add to cart" button element 220 may be determined to be human translation.

Further, multiple elements may be grouped and classified into categories. Elements assigned to the same category may reside on the same page or on different pages on the web site 130 or 180. In this case, traffic monitoring, visitor behavior monitoring, value estimation, cost computation, contribution computation, localization source determination, localization source promotion/demotion and localization source routing may be performed independently at the category level. Schemes for monitoring, value estimation, cost computation, contribution computation, localization source determination, localization source promotion/demotion, and localization source routing may also be defined at the category level so that all elements assigned to the same category will use the criteria and schemes specified for the category.

FIG. 4A shows an exemplary table that provides an example list of small televisions for sale on an online retailer's website. The televisions listed belong to the Small TVs category 410, which are similar in terms of price range and features. The table shows the average sale price 412, gross margin percentage 413, projected item life in months 414, projected views per month 415, projected conversion percentage 416, an in-store factor (to account for shop online buy in-store behavior) 417, and a computed estimated value 418 for each television. The projected values and the in-store factor are estimations based on historical data and experience. The associated element on the website 130 for the televisions in this example may be the detailed product description element 210 FIG. 2. The scheme for computing the estimated value of the content of the detailed product description element for each television in this example involves multiplying the average sale price, gross margin percentage, item life in months, projected views per month, projected conversion percentage and an in-store factor.

A product may be new or some data, such as the gross margin percentage or the lifespan, may not be available or may be difficult to obtain or project. In that case, a category based or similar item based equivalent figure may be used to compute the estimated value of the content associated with the product. FIG. 4B is a table that shows the same list of televisions as FIG. 4A. However, the estimated value at 425 is computed using a category based gross margin percentage at 420, a category based item life in months 421, a category based views per month at 422, a category based conversion percentage at 423, and a category based in-store factor at 424. These category based figures can be computed using averages of actual figures of existing similar products for which this data exists. For example, for the small televisions category 410 the category based gross margin percentage can be computed as the average of the gross margin percentage of all similar televisions.

The estimated value of the content of an element can also be computed using other schemes and it may not be restricted to products on an online retailer's website. The estimated value of the content of an element may have a fixed value and can also be based on the site owner's historical data and experience. The specific scheme used may be determined based on the type of content. For example, FIG. 5A shows an example of estimating the value of the content of a news article on a portal or news site that is supported by online advertising on the site. The table shows the article category 510, the article title 511, the average ad pay per mille (PPM) 512, and the projected lifetime views in thousands 513 for each article. PPM 512 is a commonly used measurement in advertising that represents the payment received by a website owner from an advertiser for showing an ad to one thousand viewers. It is also commonly referred to as cost per mille (CPM). In this table, the PPM 512 shows the average revenue to the portal or news site owner received from displaying the ads in each article one thousand times to visitors. The projected lifetime views in thousands 513 shows the estimated number of views that each article will get during its expected lifetime on the site. This projected value is an estimation based on historical data and experience. For example, the "Manchester United IPO" article is expected to be viewed 15,000 times by visitors before it is removed from the site. The estimated value of the content of each article 514 in this example is computed by multiplying the average ad pay per mille (PPM) 512 with the projected lifetime views in thousands 513.

There are many other ways that advertisers can pay a website owner for displaying ads, which include for example, pay per click (PPC), pay per action (PPA), pay per lead (PPL) and pay per sale (PPS). These terms are also commonly referred to as cost per click (CPC), cost per action (CPA), cost per lead (CPL) and cost per sale (CPS). In PPC, the site owner gets paid a certain amount for each click of an ad. In PPA and PPL, the site owner gets paid for a specific action (e.g., submitting a form, creating an account, subscribing to a newsletter, signing up for a trial of a product or service, etc.) that a visitor completes on the advertiser's site after clicking on the ad. In PPS, the site owner gets paid when a visitor completes a purchase of a product or service on the advertiser's site after clicking on the ad. Payments to site owners may be in the form of a fixed amount per click or action, or a percentage commission of a purchase price. The scheme for computing the estimated value described in FIGS. 5A and 5B can be applied to any content that is supported by advertising and can be based on any method of compensation to the website owner, including the PPC, PPA, PPL and PPS methods just described.

Estimating the value of content may also be useful to marketplaces (e.g., Amazon Marketplace, eBay Marketplace, etc.), affiliates, comparison services (e.g., BizRate, Shopzilla, etc.), shopping engines (e.g., Google Shopping, NextTag, PriceGrabber, etc.) and product aggregator website owners that compile, promote or offer products and services from other companies on their websites. The other companies may be online merchants or manufacturers. When a visitor clicks on a link on the website that points to another company's product or service and, as a result, a sale is made on the other company's website, the website owner gets a commission on the sale amount or a flat fee. This is also referred to as online revenue sharing. For example, FIG. 5B is a table that shows an example of estimating the value of the content of several products on a shopping engine's website. The shopping engine provides links to the products on various online merchant websites that the shopping engine is affiliated with. The table shows the product category at 520, the item name at 521, the average sales price of the item at 522, the commission percentage that the website owner gets when the item is purchased by a visitor at 523, the projected number of sales at 524, and the estimated value of the item at 525. The projected number of sales at 524 shows the estimated number of sales that the website owner expects to generate on the merchant's website during the expected lifetime of the item on the site. The projected number of sales at 524 may be based on the site owner's historical data and experience, and may also be computed at the category level, so, for example, all televisions belonging to the Small TVs category may have the same number of projected sales. The estimated value of the content at 525 of each item in this example is computed by multiplying the average sale price at 522, the commission percentage at 523, and the projected number of sales at 524.

In addition to the estimated value of the content for an element, it is also important to compute its cost of localization (e.g., cost of translation) by localization source. FIG. 6 contains an example table that shows the cost of the detailed product description content element 210 of FIG. 2 for the televisions previously listed in FIGS. 4A and 4B, for various localization sources that include machine translation 615 & 616, human translation 617 & 618 and copy editing 619 & 620. In addition, a nominal cost for no translation (i.e., leaving the content in the original language) 613 & 614 is computed. Note that the cost for no localization may be zero. The cost is computed by multiplying the number of words in the detailed description by the cost per word of the applicable localization source.

Figure 7:
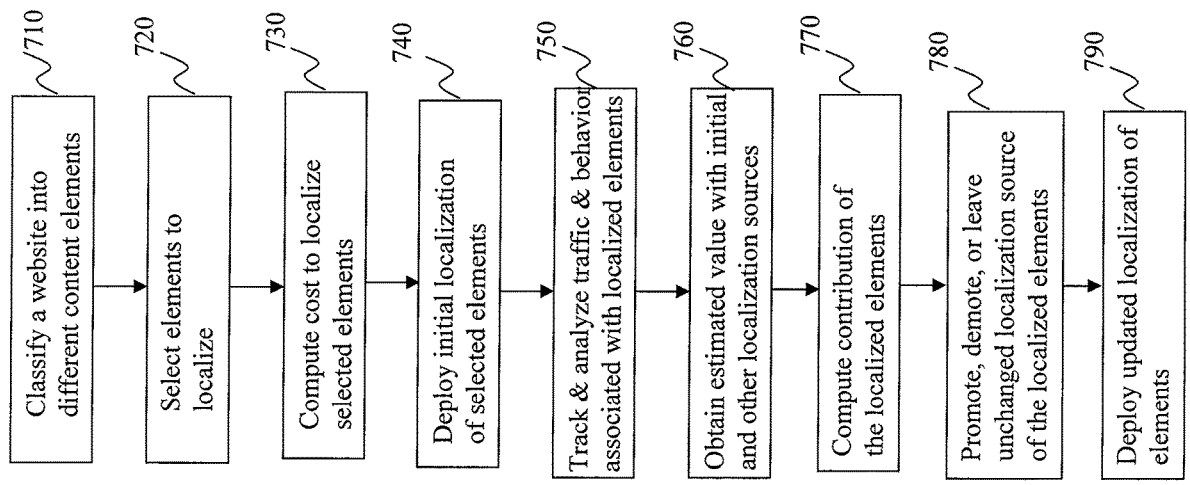
FIG. 7 is an operational flow diagram depicting an exemplary general process of automatic determination of localization sources for a website.

FIG. 7 is a flow diagram depicting an exemplary general process of determination of localization sources for a website 130 in a preferred embodiment of the current teaching. Such determined localization sources may be optimum with respect to the specific criteria associated with and provided by, e.g., the website owner or the underlying organization. At 710, the website is classified into different content elements. At 720, the elements to be localized are selected. At 730, the cost to localize the content of the selected elements is computed for the available localization sources. Note that 730 may be performed at any time before the contribution computation at 770. The cost may also be pre-computed before this process starts. At 740, the content of the selected elements is localized using an initial localization source. The initial localization source may be, for example, the cheapest available localization source. At 750, visitor traffic and behavior associated with the localized content is tracked and analyzed on the localized website 130. At 760, the estimated value of the initial localization source and of other available localization sources is obtained or computed based on the analysis of the visitor traffic and behavior, and on historical data. At 770, the contribution of the localized elements is computed based on the computed cost and the determined estimated value for the initial localization source and for the other available localization sources. At 780, the localization source of the localized content of the selected elements is promoted, demoted or left unchanged based on a decision that takes into account the computed contribution and other factors. At 790, the updated localization of the elements just promoted or demoted is deployed to the localized website.

Note that the process allows for further refinement, in which case 790 goes back to 750 where traffic and visitor behavior is tracked and analyzed based on the updated localization of the elements. New estimated values of the updated localization are then computed at 760, the contribution is also computed at 770, which leads to 780 where promotion or demotion can occur again and to the subsequent deployment of the updated localization at 790. Such refinement can be continuous, in which case 790 always goes back to 750.

Figure 8:
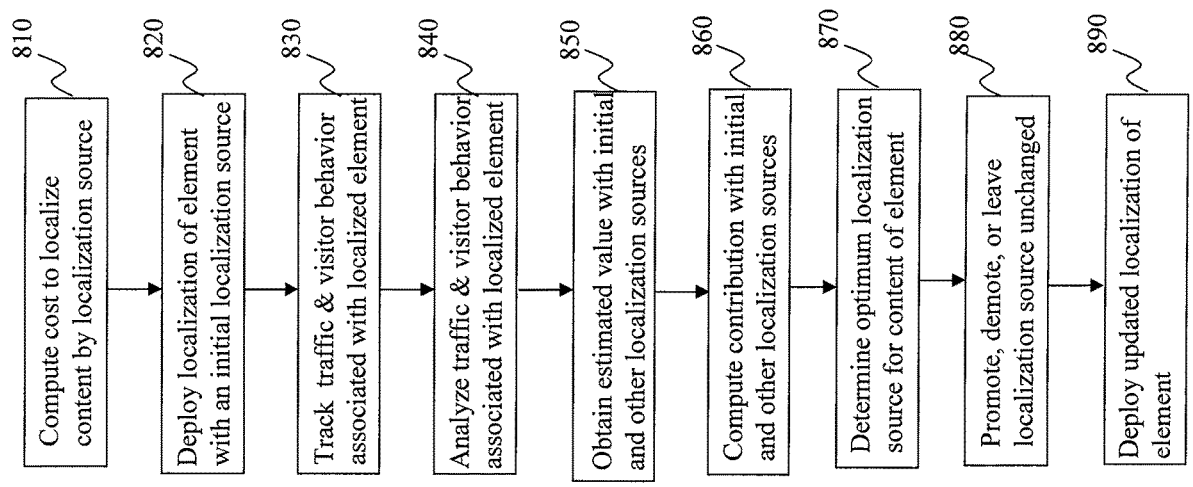
FIG. 8 is an operational flow diagram depicting an exemplary process of automatic determination of a localization source for a specific element.

FIG. 8 is a flow diagram depicting an exemplary process of determination of localization source for a specific element in a preferred embodiment of the current teaching. Such determined localization sources may be optimum with respect to the specific criteria associated with and provided by, e.g., the website owner or the underlying organization. At 810, the cost to localize the content of the element is computed for the available localization sources. Note that 810 may be performed at any time before the contribution computation at 860. The cost may also be pre-computed before this process starts. At 820, the content of the element is localized using an initial localization source and the localization deployed to the localized website 130. The initial localization source may be, for example, the cheapest available location source. At 830, visitor traffic and behavior associated with the localized content is tracked on the localized website 130. At 840, the visitor traffic and behavior associated with the localized content is analyzed. At 850, the estimated value of the initial localization source and of other available localization sources is computed based on the analysis of the visitor traffic and behavior, and on historical data. At 860, the contribution of the localized element is computed based on the computed cost and estimated value for the initial localization source and the other available localization sources. At 870, the optimum localization source is determined taking into account the computed contribution and other factors. At 880, the localization source of the localized content of the element is promoted, demoted or left unchanged based on the decision reached at 870. At 890, the updated localization of the content of the element just promoted or demoted is deployed to the localized website 130.

Same as in FIG. 7, the process of FIG. 8 allows for further refinement, in which case 890 goes back to 830 and then 840, where traffic and visitor behavior is tracked and analyzed based on the updated localization of the element. The estimated value of the updated localization is then computed at 850, the contribution recomputed at 860 and the optimum localization source recomputed at 870. At 880, the promotion or demotion can occur again and if so, a subsequent deployment of the updated localization is done at 890. Such refinement can be continuous, in which case 890 always goes back to 830.

Figure 9:
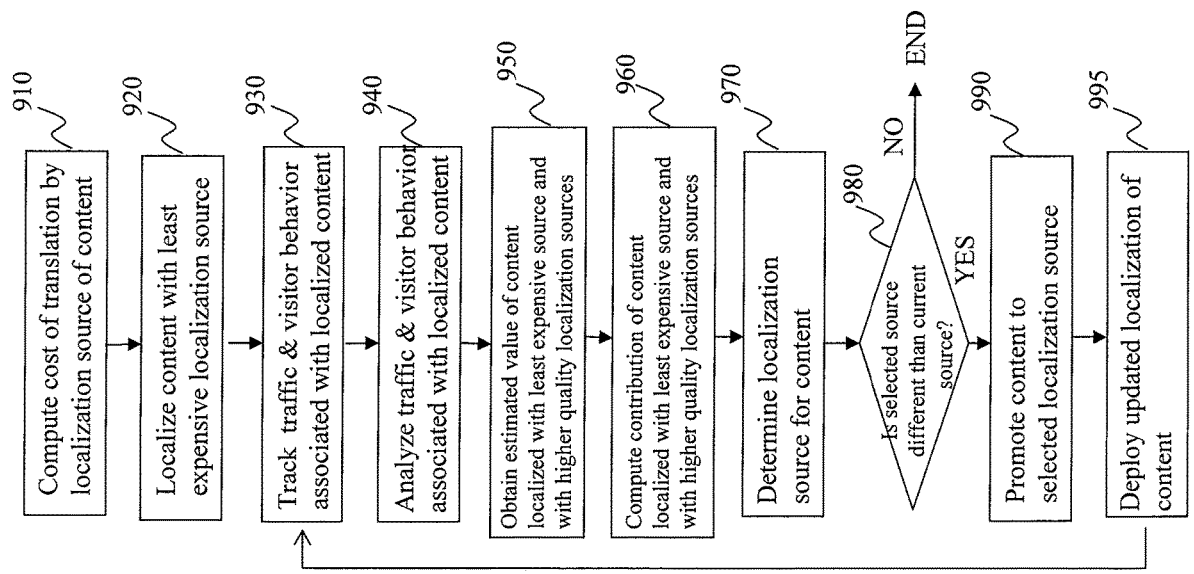
FIG. 9 is an operational flow diagram depicting an exemplary process of automatic determination of a localization source for a specific element that starts by applying the least expensive localization source.

In some embodiments of the present teaching, the process of automatic determination of a localization source may start by using the least expensive localization source for a specific element on the localized website 130 for a specific type of content that the element can display. FIG. 9 is an exemplary operational flow diagram that depicts this process. The process in the diagram starts at 910 by computing the cost of translation of the content for each available localization source. Note that computation of the cost does not have to be the first step and can be performed at any time before 960 that computes the contribution of the content. The cost may also be pre-computed before this process starts. At 920, the content is localized using the least expensive localization source and deployed to the localized web site 130.

At 930, the traffic and visitor behavior associated with the element localized with the least expensive localization is tracked for a period of time. At 940, the traffic and visitor behavior associated with the element localized with the least expensive localization is analyzed. At 950, an estimated value is obtained or computed for the content localized with the least expensive localizations source based on the actual traffic and visitor behavior. At 950, an estimated value is also obtained or computed for each additional higher quality localization source available based on historical information. At 960, the contribution of the content is computed for the least expensive localization source based on the estimated value and the computed cost of the least expensive localization source. At 960, the contribution of the content is also computed for each additional higher quality localization source based on the estimated value and the computed cost of those additional localization sources.

At 970, the localization source is determined based on the computed contributions and other related information and factors, such as a website owner specifications and available budget. Such determined localization sources may be optimum with respect to the specific criteria associated with and provided by, e.g., the website owner or the underlying organization. If the selected localization source is different than the least expensive localization source 980, the control flows to 990 where the content is promoted to the selected localization source. The updated localization of the content is then deployed to the localized website 130 at 995. If at 980 the least expensive localization source turns out to be the selected localization source, then the process ends or may go back to 930 for further analysis. After 995, control may go back to 930 to further track and analyze the content localized with the selected localization source to determine whether additional promotions may be needed.

For example, the detailed product description element 210 of FIG. 2 can be used as the element to localize and the type of content can be the description of all the televisions listed in FIGS. 4A and 4B. The detailed product description of all the listed televisions is then translated using machine translation, which is typically the least expensive localization source. FIG. 10A shows exemplary traffic and visitor behavior during a period of 30 days using machine translation for each product in the list of televisions shown in FIGS. 4A and 4B. The table shows the average sales price at 1012, gross margin percentage at 1013, in-store factor at 1014, projected item life in months at 1015, the number of views that the product description element received during the 30 day test period at 1016 and the conversion percentage of the machine translation at 1017. The estimated value of machine translation at 1018 is calculated, based on the scheme described in FIGS. 4A and 4B, by, e.g., multiplying the average sale price at 1012, gross margin percentage at 1013, in-store factor at 1014, projected item life in months at 1015, the actual number of views in the test month at 1016 and the machine translation actual conversion percentage at 1017. A category based human translation conversion percentage 1019 is also shown, which is computed based on historical conversion of similar items using human translation. The estimated value of human translation at 1020 is also calculated, based on the scheme described in FIGS. 4A and 4B, by, e.g., multiplying the average sale price at 1012, gross margin percentage at 1013, in-store factor at 1014, projected item life in months at 1015, the actual number of views in the test month at 1016 and the category based human translation conversion rate at 1019.

FIG. 10B shows an exemplary computed contribution margin for machine translation at 1054 calculated by subtracting the cost of machine translation at 1053 from the estimated value of machine translation at 1018, as computed in the table shown in FIG. 10A. The table also shows the computed contribution margin for human translation at 1057 calculated by subtracting the cost of human translation at 1056 from the estimated value of human translation at 1020, as computed in FIG. 10A. A promotion decision at 1058 is then made to promote to human translation those TVs whose contribution margin is larger for human translation. The table shows that the detail product description for the first 3 televisions was promoted to human translation. The last 2 televisions were left with machine translation.

Automatic promotion of content to a better quality more expensive localization source may be constrained by a specific budget, such as a monthly limit on translation spend. In that case, content is not promoted after the translation spend limit has been reached. A fixed budget may apply to a single localized website or spread across multiple localized websites, such as multiple localized websites 130 corresponding to the same origin website 170. In this case, the limit on the combined expenditure on all the affected localized websites needs to be managed so it does not exceed the budget. Promotion may also be restricted by other factors or preferences of the website owner. For example, a promotion based on contribution margin may be restricted by a minimum ROI hurdle. When promotion is restricted by a budget, historical data maintained by the present teaching or external sources on past content update trends and localization volumes can be used to adjust the promotion process to attempt to maintain all of the content translated using the most optimum localization source while maintaining translation spend within the desired budget. This is described in more detail in FIGS. 17, 19 and 20.

In another embodiment of the current teaching, the process of automatic determination of a localization source is conditioned on a test that determines how different localization sources affect the behavior associated with an element. One way this can be done is by testing and analyzing actual visitor behavior associated with one or more representative sample elements of a type or category of information using different localization sources. For example, a test can be performed where the localization source is the independent variable and the resulting percentage conversion the dependent variable. Various controlled variables can also be used, depending on the type of element. The data gathered from the test is used to determine the optimum localization source for the set of content in the element that the representative sample applies to.

Figure 11:
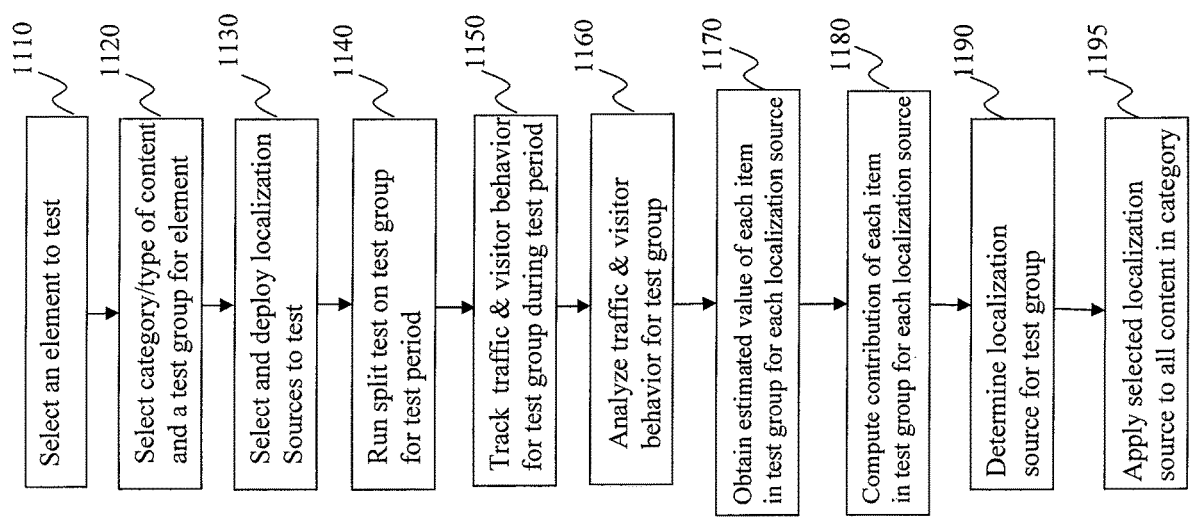
FIG. 11 is an operational flow diagram depicting an exemplary process of automatic determination of a localization source for a specific element using test groups with different localization sources.

FIG. 11 is an exemplary operational flow diagram that depicts this process. At 1110, the element to test on the website 130 is selected. At 1120, the category, or type of information to test, and the representative sample elements, or test group, are selected. At 1130, the localization sources to test are selected and deployed to the localized website 130. Once these variables are selected, at 1140 a split test (or A/B test) is executed on the test group for the desired test period. During the test, visitors to the localized website 130 will be shown the sample elements translated with each of the selected localization sources. At 1150, visitor traffic and behavior associated with the test group is tracked. At 1160, the visitor traffic and behavior associated with the test group is analyzed. At 1170, the estimated value of each of the of the sample elements in the test is obtained or computed for each localization source based on the analysis of the visitor traffic and behavior. At 1180, the contribution of each localization source in the test group is computed based on the estimated value and cost of each localization source. At 1190, a localization source for the test group is determined taking into account the contribution and other factors and by this process, the selected localization source may be optimum with respect to the contribution and considered factors. At 1195, the optimum localization source is applied to the set of content belonging to the category or type tested for the element tested.

For example, an online retailer that wants to localize the description of all small TVs it sells on its site selects the category of content to test as "Small TVs" and selects the list of televisions shown in FIGS. 4A and 4B as the test group for all small televisions. The corresponding element to localize for the televisions is the detailed product description element 210 of FIG. 2. A test can be done on this element using the test group with two localization sources: human and machine translation. FIGS. 12A and 12B show the results of an example test performed during a period of 30 days for the test group for both human and machine translation localization sources.

FIG. 12A shows exemplary traffic and visitor behavior during a period of 30 days using both machine and human translation for the televisions in the test group belonging to the "Small TVs" category. In this example, a split test (i.e., A/B test) was performed where each localization source was randomly shown to visitors in equal percentages (50% of the visitors saw machine translation and 50% of the visitors saw human translation) for each television in the test group. The table shows the average sales price at 1212, gross margin percentage at 1213, in-store factor at 1214, projected item life in months at 1215, the number of views that the product description element received during the 30 day test period at 1216, the actual conversion percentage for machine translation during the test at 1217, and the actual conversion percentage for human translation during the test at 1219. The estimated value of machine translation at 1218 is calculated, based on the scheme described in FIGS. 4A and 4B, using the machine translation conversion percentage at 1217. The estimated value of human translation at 1220 is also calculated, based on the scheme described in FIGS. 4A and 4B, using the human translation conversion percentage at 1219.

FIG. 12B shows exemplary computed contribution margin for machine translation at 1254 calculated by subtracting the cost of machine translation at 1253 from the estimated value of machine translation at 1218, as computed in FIG. 12A. The table also shows the computed contribution margin for human translation at 1257 calculated by subtracting the cost of human translation at 1256 from the estimated value of human translation at 1220, as computed in FIG. 12A. A localization source is then determined based on which localization source (machine or human) has the highest contribution margin, which can optimize the choice of localization source. FIG. 12B shows that human translation is the optimized localization source for the detail product description of the first television, and machine translation is the optimized localization source for the detail product description of the last 4 televisions.

Based on the data in this table, these findings can be generalized and an automatic determination made that because machine translation is the optimum localization source for 80% of the televisions in the test group, then the optimum localization source to be applied to all televisions in the "Small TVs" category that the online retailer sells is machine translation. FIG. 13A shows that the same test described in FIG. 12A. However, in FIG. 13B, the average of the estimated value of machine translation at 1330 and the average cost of machine translation at 1331 is computed for the set of TVs in the test group. The contribution margin of machine translation at 1332 is then calculated by subtracting the average cost of machine translation at 1331 from the average estimated value of machine translation at 1330. Finally, a contribution return on investment (ROI) is calculated for machine translation at 1333 by dividing the contribution margin of machine translation at 1332 by the average cost of machine translation at 1331.

The same calculations are performed for human translation. The average of the estimated value of human translation at 1334 and the average cost of human translation at 1335 is computed for the set of TVs in the test group. The contribution margin of human translation at 1336 is then calculated by subtracting the average cost of human translation at 1335 from the average estimated value of human translation at 1334. Finally, a contribution return on investment (ROI) is calculated for human translation at 1337 by dividing the contribution margin of human translation at 1336 by the average cost of human translation at 1335.

The optimum localization source at 1338 is then determined based on which localization source (machine or human) has the highest contribution return on investment (ROI). The table shows that machine translation is the optimum localization source for the set of small TVs in the test group. The finding is generalized and machine translation is applied as the optimum localization source for all small size televisions the online retailer currently sells and to all new models of small size televisions that the retailer will sell in the future.

The example described in FIGS. 13A and 13B uses contribution return on investment (ROI) as the deciding factor when determining the optimum localization source. The advantage of using contribution ROI vs. the contribution margin used in previous examples is that contribution ROI takes cost into consideration and maximizes the return on whatever money is invested in localizing content. Both contribution margin and contribution ROI may also be taken into account, as described in FIGS. 15 and 16.

Figure 14:
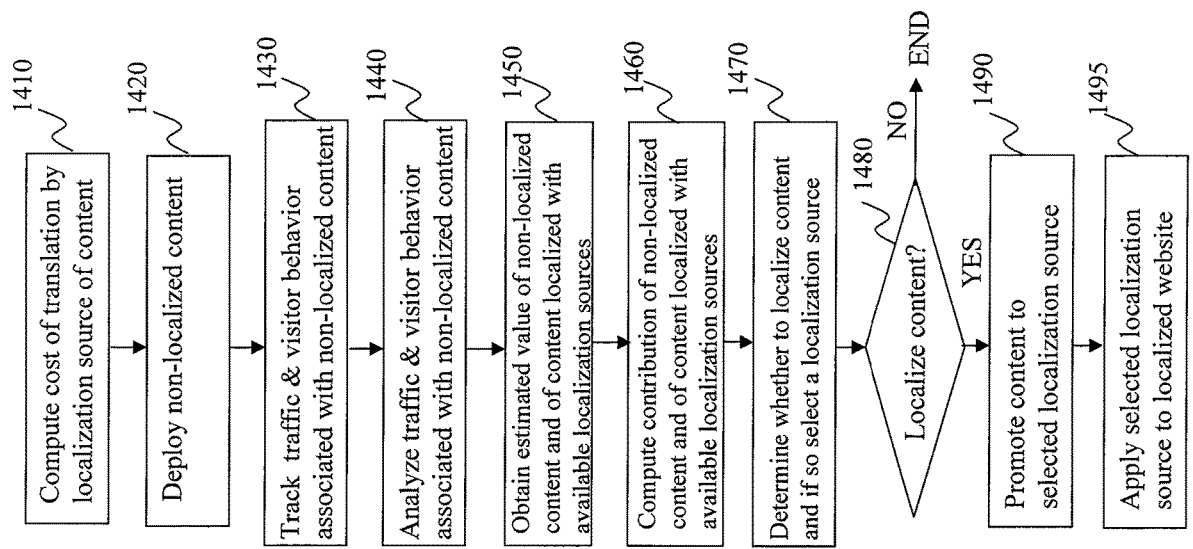
FIG. 14 is an operational flow diagram depicting an exemplary process of automatic determination of a localization source for a specific element that starts by not applying a localization source to the content.

In another embodiment of the current teaching, the process of automatic determination of a localization source may not start with applying a localization source to the content for the specific element on the localized website 130, so the content is not translated and left in the original language. FIG. 14 is an operational flow diagram that depicts this exemplary process. The process in the diagram starts at 1410 by computing the cost of translation for each available localization source. Note that computation of the cost does not have to be the first step and can be performed at any time before 1460 that computes the contribution. The cost may also be pre-computed before this process starts. At 1420, a localization source is not applied, so the content is deployed on the localized website 130 without localization.

At 1430, the traffic and visitor behavior associated with the element that has not been localized is tracked for a period of time. At 1440, the traffic and visitor behavior associated with the element that has not been localized is analyzed. At 1450, an estimated value is obtained or computed for the content that has not been localized based on the actual traffic and visitor behavior. Also at 1450 an estimated value is obtained or computed for the content for each available localization source based on historical information. At 1460, the contribution of the content that has not been localized is computed based on the estimated value and the computed cost (if any) of not localizing the content. Also at 1460, the contribution of the content is computed for each available localization source based on the estimated value and the computed cost of each of the available localization sources.

At 1470, it is determined whether the content should be localized, and if so, a localization source is determined based on the computed contribution and other related information and factors, such as a website owner specification and available budget. If the content should be localized at 1480, then control flows to 1490 where the content is promoted to the selected localization source. At 1495, the selected localization source is applied to the content on the localized website. If applying no localization (i.e., not translating the content) turns out to be the selected option, then the process ends. After 1495, control may go back to 1430 to further track and analyze the content localized with the selected localization source to determine whether additional promotions may be needed. Control may also go back to 1430 from 1480 in the case where in 1480 it is decided not to apply any localization to account for the possibility that a localization may be needed in the future.

FIGS. 15A and 15B describe an example of the above process that compares three different localization sources (machine, human & copy edit) against the option of applying no localization (i.e., performing no translation) for product descriptions. FIG. 15A shows exemplary traffic and visitor behavior during a period of 30 days using no localization for each product description in the list of televisions shown in FIGS. 4A and 4B. FIG. 15A shows the average sales price at 1512, gross margin percentage at 1513, in-store factor at 1514, projected item life in months at 1515, the number of views that the product description element received during the 30 day test period at 1516 and the actual conversion percentage of no localization at 1517. The estimated value of no localization at 1518 is calculated using the actual conversion percentage of no localization at 1517. A category based conversion percentage lift for machine translation at 1519, human translation at 1521 and copy editing at 1523 is also shown. These are percentage lift figures derived from historical conversion of similar items using these localization sources. A conversion rate is computed for each localization source (machine, human & copy edit) based on multiplying the lift percentage by the no localization conversion rate. Actual historical conversion percentages for machine translation, human translation and copy editing may also be used instead of a conversion percentage lift. The estimated value of machine translation at 1520, human translation at 1522 and copy editing at 1524 is then calculated, based on the scheme described in FIGS. 4A and 4B, using the computed conversion rate for each localization source.

FIG. 15B shows an exemplary computed contribution margin for no localization at 1534 calculated by subtracting the cost of no localization at 1533 (which may be zero) from the estimated value of no localization at 1518, as shown in FIG. 15A. The table in FIG. 15B shows the computed contribution margin for machine translation at 1538, human translation at 1542 and copy editing at 1546 calculated by subtracting the cost of machine translation at 1537, cost of human translation at 1541 and cost of copy editing at 1545 from the estimated value of machine translation at 1520, human translation at 1522 and copy editing at 1524, as shown in FIG. 15A. The table in FIG. 15B also shows a computed contribution return on investment for no localization at 1535, machine translation at 1539, human translation at 1543 and copy editing at 1547. The optimum localization source at 1548 is determined by selecting the localization source or no localization with the highest contribution ROI that clears the contribution ROI hurdle rate. The contribution ROI hurdle rate is the minimum ROI that the online retailer is willing to accept from the localization source. In this example, the contribution ROI hurdle is 300%, meaning that if the ROI is below 300%, then the localization source is not selected even if it has a higher contribution margin than the other localization sources. The table shows that the detail product description for the first 2 televisions was promoted to copy editing. The third television was promoted to human translation. The fourth television was promoted to machine translation, and the last television was left without localization (i.e., in the original language).

Similar to FIGS. 12A and 12B, FIGS. 16A and 16B show an example table with the results of a 30 day split test performed to determine how different localization sources affect the behavior associated with the representative sample of televisions of FIGS. 4A and 4B. Similar to the test described in FIGS. 12A and 12B, each localization source was randomly shown to visitors in equal percentages (25% of the visitors saw no localization, 25% saw machine translation, 25% saw human translation and 25% saw copy editing) for the product description of each television in the test group. FIG. 16A shows the traffic and visitor behavior using no translation, machine translation, human translation and copy editing for each product in the list of televisions shown in FIGS. 4A and 4B. The table in FIG. 16A shows the average sales price at 1612, gross margin percentage at 1613, in-store factor at 1614, projected item life in months at 1615, the number of views that the product description element received during the 30 day test period at 1616, and the actual conversion percentage for no translation at 1617, machine translation at 1619, human translation at 1621 and copy editing at 1623 during the test. The estimated value of no translation at 1618, machine translation at 1620, human translation at 1622 and copy editing at 1624 are calculated, based on the scheme described in FIGS. 4A and 4B, using their respective actual conversion percentages.

FIG. 16B shows an exemplary computed contribution margin for no translation at 1634, machine translation at 1638, human translation at 1642 and copy editing at 1646, which is calculated by subtracting the respective costs of localization from the respective computed estimated values. The table in FIG. 16B also shows a computed contribution return on investment (ROI) for no translation at 1635, machine translation at 1639, human translation at 1643 and copy editing at 1647. The optimum localization source at 1648 is determined by selecting the localization source or no localization with the highest contribution margin that clears the contribution ROI hurdle rate of 300%. The table in FIG. 16B also shows that the detail product description for the first television was promoted to copy editing. The second and third televisions were promoted to human translation. The fourth television was promoted to machine translation, and the last television was not localized (i.e., left without translation in the original language).

The examples discussed above provide exemplary criteria applied in selecting the localization source of content examining only the content in isolation. For example, in FIGS. 12A and 12B the decision on the target localization source for each product is made individually, without taking into consideration other products. Similarly, in FIGS. 13A and 13B, the decision about the target localization source for the Small TVs category is made without taking into consideration the other product categories the online retailer carries (e.g., Large TVs, Appliances, etc.). In reality, to maximize the overall contribution (e.g., margin, ROI), decisions need to be made about what investments to make in the context of other investment options and limitations (e.g. other content to be localized, fixed costs, overall budget, competing external investment options). This may be done by comparing the contribution of localization investment decisions across all content to be localized.

FIG. 17A shows how to determine the localization source for multiple products. Using the same example of FIGS. 16A and 16B, each row in the table of FIG. 17A is a possible investment decision defined by a combination of the product at 1711, an initial localization source at 1712, and a promoted localization source at 1713. The initial localization source has an associated cost at 1714 and an associated contribution margin at 1715, and the promoted localization source has an associated cost at 1716 and an associated contribution margin at 1717. The costs and contribution margins are calculated as described in FIGS. 16A and 16B. The incremental cost of promotion at 1718 is calculated by subtracting the cost of the initial localization source at 1714 from the cost of the promoted localization source at 1716. The incremental contribution margin of promotion at 1719 is calculated by subtracting the contribution margin of the initial localization source at 1715 from the contribution margin of the promoted localization source at 1717. The incremental contribution ROI of promotion at 1720 is calculated by dividing the incremental contribution margin of promotion at 1719 by the incremental cost of promotion at 1718. In the case of an incremental cost of zero, an infinite or arbitrarily large ROI may be used.

Figure 17B:
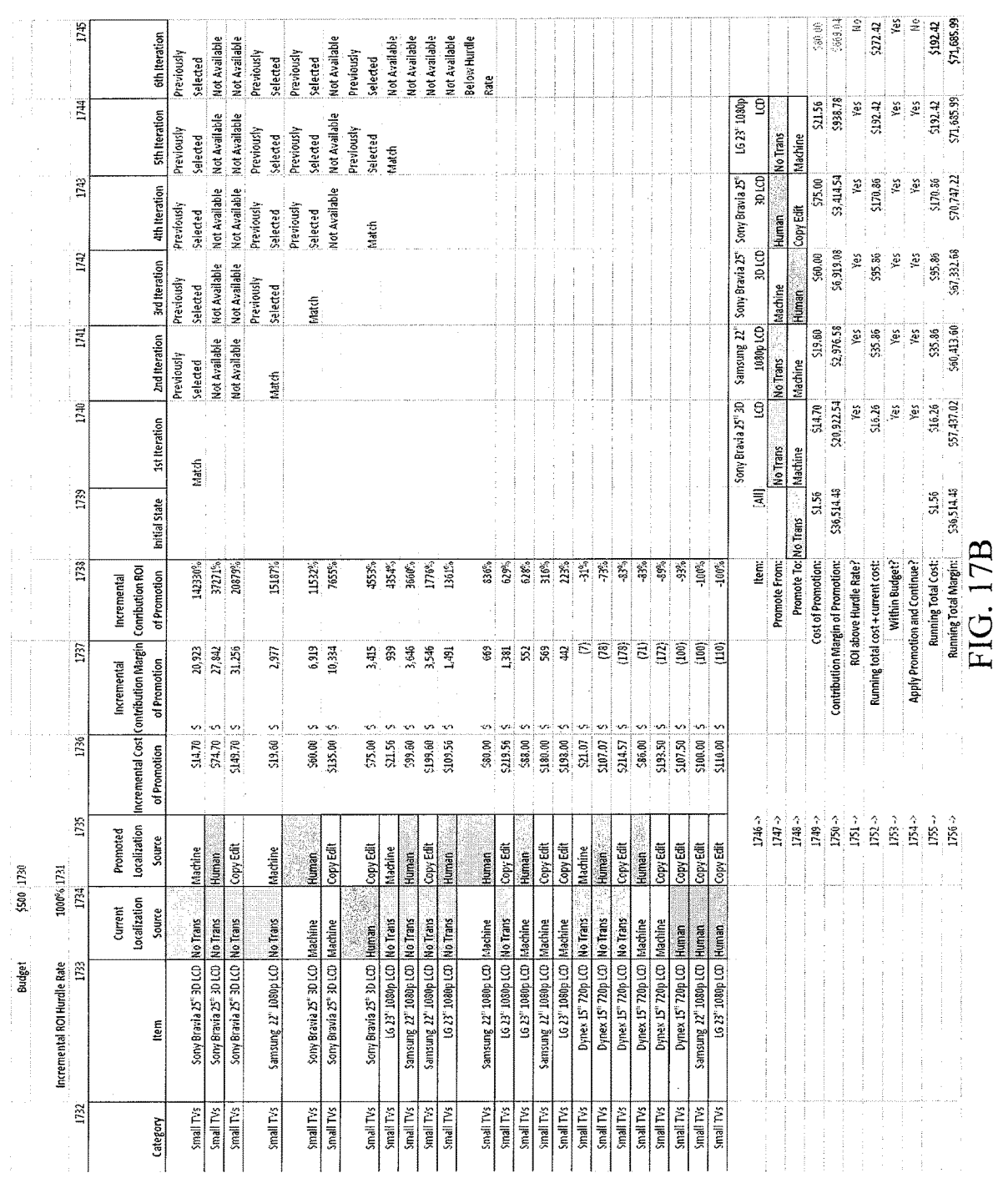

An exemplary scheme for maximizing profit across multiple products, or profit maximizing scheme, involves using the highest ROI options available. To facilitate this, the table in FIG. 17B takes the columns 1710, 1711, 1712, 1713, 1718, 1719, and 1720 from the preceding table in FIG. 17A and sorts them in descending order by incremental ROI of promotion at 1738. A maximum budget of $500 is specified at 1730 and an incremental ROI hurdle rate of $1,000% is specified at 1731. The scheme used in this example to maximize profit across multiple products involves repeatedly taking the highest incremental ROI of the promotions available until the budget at 1730 is spent or until the ROI hurdle rate at 1731 is met, whichever happens first. FIG. 17C shows the initial state before applying this scheme. All items are assigned an initial localization source at 1762, which in this example is no translation (the least costly). The total cost and total contribution margin, as calculated in FIGS. 16A and 16B, are also shown for each product at 1763 and 1764. A fixed cost at 1766, of operating the localized website (e.g., a monthly hosting, bandwidth and/or management fee incurred either internally by the website owner or billed by a third party) may be added to the total cost and subtracted from the total contribution margin. These values are used to initialize the running total cost at 1755 and the running total margin at 1756 in the initial state of FIG. 17B at column 1739.

FIG. 17B shows each progressive iteration at columns 1740-1745 and the state of each iteration in rows 1746-1756. The iterations start with the first row in the table, since it has the highest incremental ROI, and continue going down one row at a time in order of decreasing ROI until the budget is reached or the ROI hurdle rate is met. In the first iteration at 1740, the scheme's process determines that the first highest ROI investment decision is available because the current localization source at 1734 for the item at 1733 matches the current localization source for that item. Looking at the first iteration at column 1740, the promotion with the highest ROI in this example is the Sony Bravia 25" 3D LCD, at 1746, being promoted from no translation ("No Trans") at 1747 to machine translation at 1748. The incremental cost of such promotion of $14.70 is at 1749 and the incremental contribution margin of such promotion of $20,922.54 is at 1750. The process compares at 1751 the incremental ROI for this localization source promotion option at 1738 against the ROI hurdle rate at 1731. During the first iteration of this example, the incremental ROI for the Sony Bravia 25" 3D LCD is 142,330%, which is above the 1,000% hurdle rate. In this way, an answer to the question "ROI above Hurdle Rate?" at 1751 is "Yes". The process then compares at 1753 the previous running total cost plus the incremental cost of localization under consideration at 1752 against the budget 1730. During the first iteration of this example, the previous running total is $1.56 (from the initial state at 1739) and the incremental cost of promoting the localization source is $14.70, so the "Running total cost+current cost:" at 1752 is calculated as the sum of $16.26, which is below the budget of $500. Therefore the answer to question "Within Budget?" at 1753 is "Yes". At 1754, if both the criteria at 1751 and 1753 are acceptable, the process assigns the promoted source to the item's current source, updates the running total cost at 1755, updates the running total margin at 1756, and continues with its next iteration. During the first iteration of this example, since the promotion being considered is above the ROI hurdle rate and below budget, the answer to question "Apply Promotion and Continue?" at 1754 is "Yes", the running total cost at 1755 is updated to $16.26, the running total margin at 1756 is updated to $57,437.01 and the process continues with the second iteration at 1741.

During the second iteration at 1741 the process checks the next two highest ROI options, but is unable to select these localization options because the current state of the source of the Sony Bravia 25" 3D LCD item, as applied by the first iteration of this scheme, is "Machine", which does not match any of the current sources in the next two rows of 1734 ("No Trans") for that item. In this case, the process determines that the fourth-highest ROI investment decision is available because the current source at 1734 for the fourth item at 1733 ("No Trans") matches the current state of the source for that item. Again, the incremental ROI from 1738 and running total cost plus cost of promotion at 1755 are compared against the ROI hurdle rate at 1731 and budget at 1730, and the process assigns the promoted source to the item's current source in state, updates the running total cost at 1755, updates the running total margin at 1756, and continues with its next iteration.

During the sixth iteration, at 1745 the process arrives at a decision that the promotion being considered is below the ROI Hurdle rate at 1751, the current iteration terminates and the process stops. The current localization source for each item at the time of termination becomes the final localization source that is then applied to the content. If the process had terminated because there was insufficient budget remaining to make the next localization source promotion in full, then any remaining budget may be invested into that localization source promotion to promote a portion of that content. FIG. 17D shows the final localization sources to be applied to each example item at 1772, as well as the cost spent at 1773 and the contribution margin at 1774 and contribution ROI at 1775 achieved for each item. The total cost spent of $192.42 and the total contribution margin achieved for all the products is shown at 1776. This example shows the optimal (maximum) margin or profit that can be attained by selecting localization sources with the given costs and contribution margins given the budgetary and hurdle ROI constraints. A maximum overall margin or profit can be obtained with this process by setting the budgetary constraint to infinity and setting the ROI hurdle constraint to 0%.

Although profit maximization is a common objective, a site owner may wish to instead maximize the net ROI on his/her site localization investment. The profit maximizing scheme described above can also achieve this, by instead terminating investment decisions once the net ROI (calculated as the running total margin divided by the running total cost) begins decreasing. Given any non-zero fixed cost of, for example, operating the localized website (such as monthly hosting, bandwidth and/or management fees incurred either internally by the website owner or billed by a third party), the net ROI will initially be negative, and will increase (as it is being combined with the initial high-incremental-ROI decisions) until the incremental ROI drops enough that the net ROI will begin decreasing as well. This point happens before the profit maximizing point.

In the previous example shown in FIGS. 17A-17D, the process determines the optimum localization sources for specific products in a group while considering the contribution impact of localizing all the other products in the group. This scheme may also be applied to multiple groups of content (e.g. categories of products on an ecommerce site). In this way, a website owner may make localization investment decisions for a whole website while simultaneously considering any costs not dependent on the current investment decisions ("fixed costs") and an upper bound on money available to invest ("budget").

FIG. 18A demonstrates how to do this at the product category level. It shows example data for a website offering items for sale that belong to just two product categories (Small TVs and Large TVs) where three localization options are considered: no translation, machine translation, and human translation. The cost of these localization options at 1811, 1814 and 1817 respectively have been provided, based on a per-word translation cost and estimates of words present within the content. The value of these localization options at 1812, 1815 and 1818 respectively have been provided, based on an A/B test with a sample of this content receiving the localization options and calculations as detailed in earlier examples. The margin of each of these localization options at 1813, 1816 and 1819 respectively is calculated as the difference between the cost and the value.

FIG. 18B shows the associated investment decisions, defined by combinations of the category at 1820, initial localization sources at 1821, and a promoted localization sources at 1822. Each row in the table represents a possible combination. The costs and margins at 1823, 1824, 1825, and 1826 are taken from the table in FIG. 18A. The incremental cost of promotion at 1827 is calculated by subtracting the cost of the initial localization source from the cost of the promoted localization source. The incremental margin of promotion at 1828 is calculated by subtracting the margin of the initial localization source at 1824 from the margin of the promoted localization source at 1826. The incremental ROI of promotion at 1829 is calculated by dividing the incremental margin of promotion at 1828 by the incremental-cost of promotion at 1827. In the case of where the incremental cost is zero, an infinite or arbitrarily large ROI may be used.

Figure 18C:
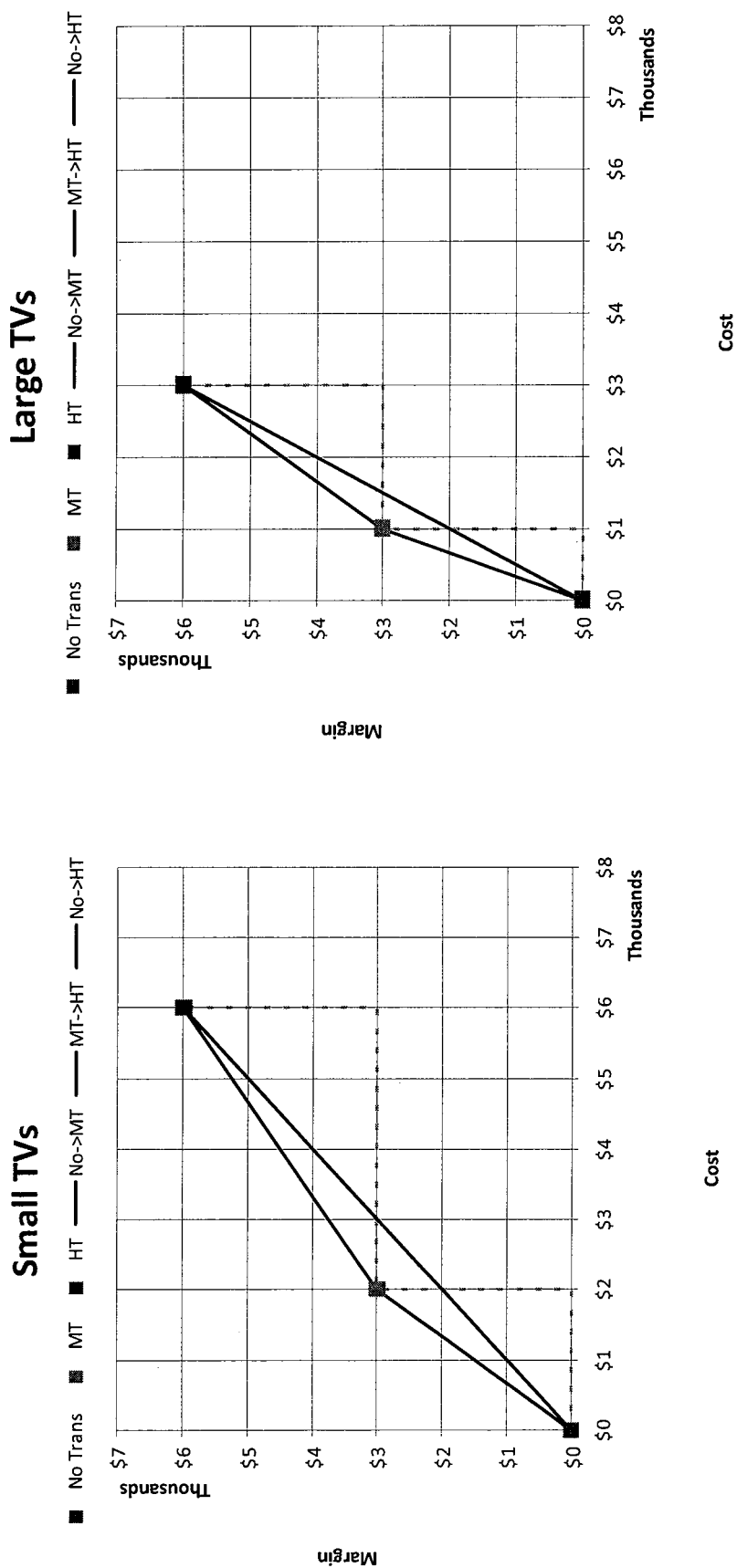
FIG. 18C shows the same information as FIG. 18B in a graphical format.

FIG. 18C shows the same information as FIG. 18B, but in a graphical rather than tabular format. Each investment decision from FIG. 18B is represented as a vector in FIG. 18C with width (X axis) equal to the cost of the investment, height (Y axis) equal to margin of the investment, and slope equal to the ROI of the investment. These vectors may be added to visualize the net ROI and profit of multiple decisions.

Figure 19B:
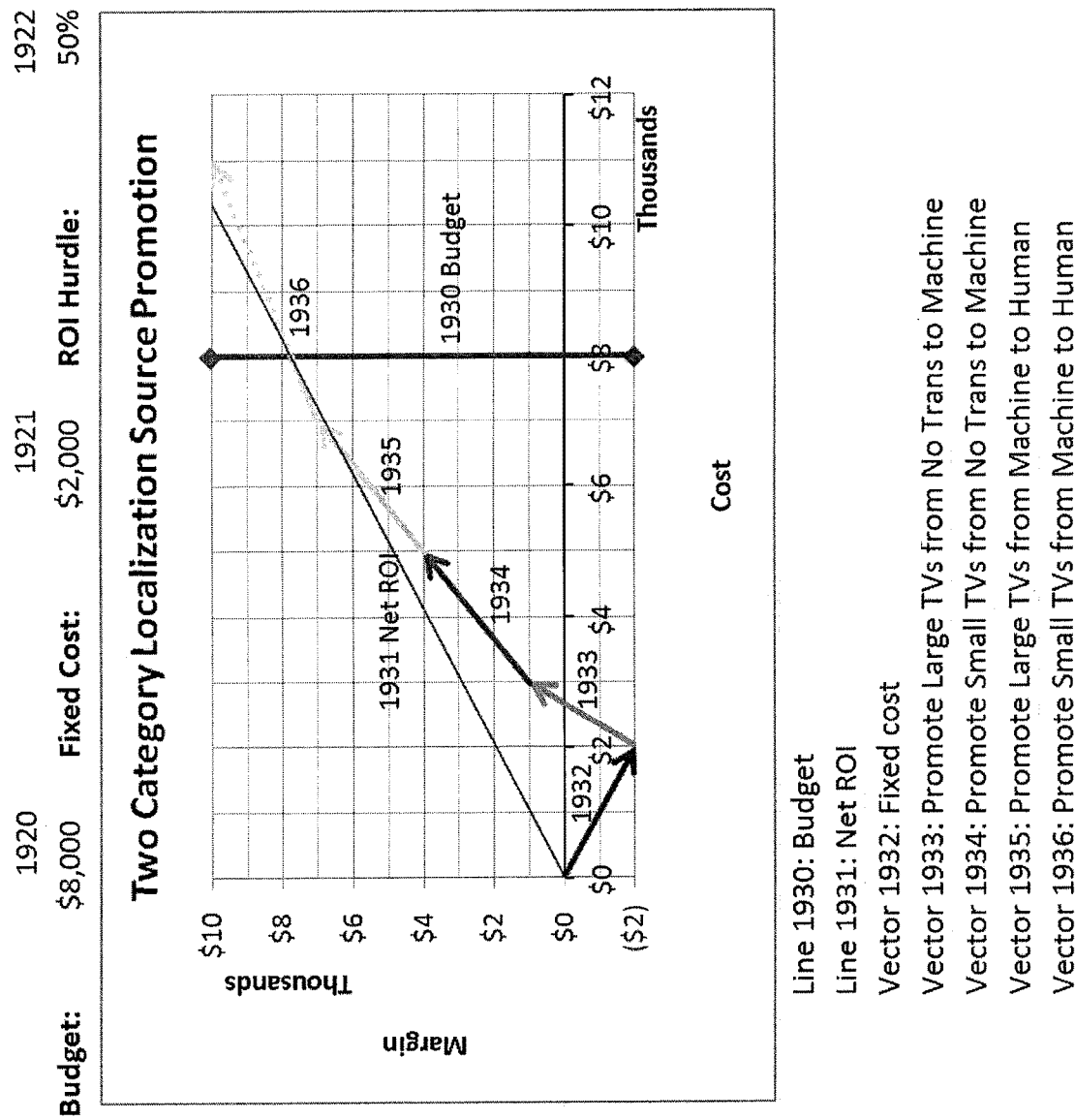
FIG. 19B shows the net result of applying localization source selection criteria to the example content of FIG. 19A.

FIG. 19A shows the same table listed in FIG. 18B with the rows sorted in descending order by Incremental Contribution ROI of Promotion at 1919. The chart in FIG. 19B shows the net result of applying this localization source selection criteria to the example content of FIG. 19A. In this example, there is a budget at 1920 of $8,000, a fixed cost at 1921 of $2,000, and an ROI Hurdle rate at 1922 of 50%. The function of the budget and ROI hurdle rate has been discussed in previous examples. The budget is represented in the chart as a vertical line at 1930. The fixed cost is an additional factor introduced in this example that represents the fixed cost to the website owner. This may be the cost of operating the localized website and may include, for example, hosting, bandwidth and management fees incurred either internally or billed by a third party.

The chart in FIG. 19B is generated by first plotting the $2,000 fixed cost represented by the vector at 1932. Subsequent vectors in the chart are plotted by applying the iterative scheme described in FIGS. 17A-17D. The iterations start with the first row in the sorted table of FIG. 19A, since it has the highest incremental ROI (300%), and continues going down one row at a time in order of decreasing ROI until the budget is reached or the ROI hurdle is met. During the first iteration, the first row containing the localization source promotion combination of no translation ("No Trans") initial source to machine translation ("Machine") promoted source for Large TVs is applied and plotted in the chart represented by the vector at 1933. The incremental ROI of this first promotion is above the 50% ROI hurdle and after applying the promotion the total cost remains within budget. During the second iteration, the second row with the second highest ROI is then skipped because it requires an initial localization source of no translation for Large TVs, but the current localization source applied to Large TVs in the first iteration was machine translation, so this promotion is not available. The next row having the third highest ROI (150%) can be applied and plotted in the chart in the second iteration since it is for the Small TVs category and the initial localization source of "No Trans" matches the current source of the Small TVs category (since no localizations have yet been applied). Further, the incremental ROI of this promotion is above the 50% ROI hurdle and after applying the promotion the total cost remains within budget. This localization promotion is plotted in the chart at vector 1934. During the third iteration, the fourth row containing machine translation as the initial localization and human translation as the promoted localization source for Large TVs, which has the next highest ROI (150%), is considered and applied because the current source for Large TVs is machine translation (as promoted in the first iteration). Further, the incremental ROI of this promotion is above the 50% ROI hurdle and after applying the promotion the total cost remains within budget. This localization promotion is plotted in the chart at vector 1935. Finally, during the fourth and final iteration, the fifth row in the table containing no translation as the initial localization and human translation as the promoted localization source for Small TVs is skipped because it requires an initial localization source of no translation for Small TVs, but the current localization source applied to Small TVs in the second iteration was machine translation, so this promotion is not available. The next and final row having the lowest ROI (75%) is available since it is for the Small TVs category and the initial localization source of "Machine" matches the current state of the Small TVs category. Further, the incremental ROI of this promotion is above the 50% ROI hurdle. However, the promotion cannot be applied because after applying the promotion the total cost will go over the $8,000 budget. This localization promotion is plotted in the chart at vector 1936, the solid part stays within budget, but the dotted line is above budget. In this case where the promotion could not be applied in full to all products in the category, the scheme may apply the promotion partially to only some of the products in the category until the budget is reached in full.

The profit maximizing scheme described in FIGS. 19A and 19B takes into account that additional margin can be attained by making additional investments at ROIs that are lower than the higher-ROI, already-selected investments, and uses as much of the budget as possible. Since all possible investment decisions (even across different units of content) were sorted by descending ROI of the investment decision or slope of the vectors, the net margin along the vector path at any x-value is the maximum net margin that could be achieved by selecting vectors/investments. Consequently, the described scheme generates an optimal result when a budgetary constraint is introduced. Also, since further investments into promotions of content already selected for localization were also considered, all investment opportunities are considered. In this example, the end result of the localization decisions resulted in a net margin (profit) of $7,750, and a net ROI of 97% ($7,750/$8,000).

Further, a determination of the optimum localization sources for multiple groups of content, while simultaneously considering the impact of localizing other groups, is not limited to categories of products on an ecommerce site, as described in FIGS. 18 and 19. The same process can be applied to any grouping of items. Grouping could be defined based on logical arrangement of items, specific needs or reasons, or even arbitrarily. For example, a news website may group articles by news category, such as local, national, international, politics, business, etc. and determine the optimum localization source for each of these categories. Groups may also be defined based on value (perceived or measured), margin or ROI, even when the items within a group are not logically related. For example, a website owner may decide, perhaps after performing some split tests as described in FIGS. 11, 12 and 16, to group the content on a website into 2 categories: High Value and Low Value, and perform human translation on all High Value items and machine translation on all Low Value items. The website owner may then decide to put the navigation (e.g., menu items), headers, footers and all content within the home page, company information pages and services offering pages in the High Value category; and the news, press releases, archives and support pages in the Low Value category.

Additionally, the content to benefit from automatic determination of localization source can be either existing content or content that is yet to be generated. In this situation, historical data about generation of similar content (e.g. historical data about past localization activity by category, number of products per month created in each category on an ecommerce website, etc.), other data (e.g. trend adjustments, release schedules, promotional/campaign schedules, etc.) and human input can be combined to generate forward-looking estimates of localization volumes, costs and margins. Such data may be tracked and stored by the system described in this teaching (e.g., via the Traffic Monitoring Component 330, Visitor Behavior Monitoring Component 340, Budget & Other Factors 350, and Database 390 of FIG. 3), or be external to the system (e.g., External Data Sources 190 of FIG. 3). For example, the current teaching may track all localization performed and maintain historical data and trends about the amount of content localized by each category, and store it in the financial database 390-c. The estimates for a given forward-looking time period (e.g. the upcoming month) are then combined with a budget for that time period, and a profit maximizing scheme can be applied, such as the ones previously described in FIGS. 17 & 19, to arrive at a decision to how to localize content as it is created during this time period as a function of its category.

The above approach is effective for website owners who have some degree of flexibility in their budget to adapt to the discrepancy between the predicted amount of content to be localized and the actual amount of content that is localized. For site owners who require more precise control of their spending within budgetary time periods (e.g., a monthly budget), a further refinement may be applied. Any time ($T_{current}$) during the budgetary time period (from $T_{initial}$ to $T_{final}$) that new content is available for localization (e.g., once a day if a daily process is followed, or hourly, or even immediately as new content becomes available if sufficient computational resources are available), a profit maximizing scheme may be reapplied. Instead of using the original estimate of expected content from $T_{initial}$ to $T_{final}$, a new estimate is generated as the current amount of content waiting for localization at time $T_{current}$ plus a new expected amount for the remainder of the time period (i.e., from $T_{current}$ to $T_{final}$. This updated content estimate is the basis for new cost, value, margin, and ROI calculations when the profit maximizing scheme is applied again. Accordingly, the budget that is used as an input for the scheme is the remaining budget (i.e., the original budget minus any costs incurred from $T_{initial}$ to $T_{current}$). This ensures that anytime new content is available for localization, the investment decisions for that content take into account the available budget. This is important, for example, if early on in the time period, a greater than expected amount of content was generated, since later on, the localization decision would limit the investment based on the reduced budget.

While the above approach is effective in achieving a good control on a budget, it does introduce the possibility for systematic under-optimization of profit. For example, if a large amount of low contribution ROI content is generated in the beginning of the budgetary time period, it may consume an excessive portion of the budget, and later high contribution ROI investments may be unavailable due to reduced budget. This can be mitigated by introducing a dynamic budget for each unit or category of content that changes as the time period elapses. A profit maximizing scheme continues to be applied using the overall remaining monthly budget as an input, but the per-unit or per-category dynamic budget is later applied to the localization process to cut-off localization activity on a per-unit or per-category basis. This dynamic budget may be computed several ways. Three exemplary methods for calculating a dynamic budget with respect to p, the proportion of the period elapsed, are presented below. The examples discuss categories, but the same logic may be applied to individual units of content, such as individual products. One example method for calculating the dynamic budget for a category may be as a proportion of the category budget equal to the proportion of the billing period elapsed:

$$\text{Dynamic Budget} = b_c \times p$$

In the above formula, $b_C$ is the budget for the category for the budgetary period or the expected future investment in this category (i.e. the expected cost of localization for this category), which is used as an input to a profit maximizing scheme, in order for the scheme to determine the optimum localization source. Notably, this may be 0, especially in the case where the remaining overall budget is small or 0, and some or all categories may not have been selected for localization. This method is suitable for website owners who wish to control costs over the course of the budgetary period but who still wish to ensure all content is localized on a timely manner as long as there is budget available irrespective of the contribution ROI of the content to be localized, though this may come at the expense of having unavailable budget later in the budgetary period for higher ROI content.

A second exemplary method for calculating the dynamic budget for a category may be as follows:

$$\text{Dynamic Budget} = b_C \times p^{\frac{1}{ROI_{category}}}$$

In the above formula, $b_C$ is again the budget for the category for the budgetary period or the expected future investment in this category, p is the proportion of the period elapsed, and $ROI_{category}$ is the ROI of localizing this category with the selected localization source. The formula multiples $b_C$ by p raised to the power of $1/ROI_{category}$. This method has the benefit that it allows for the preferential localization of high contribution ROI content towards the beginning of the budgetary time period when there is still uncertainty about the future content that will need to be localized. Specifically, the dynamic budget places a greater restriction on localizing low-ROI content towards the beginning of the time period, preventing such content from exhausting available budget that could later be assigned to localizing content with a higher-ROI, while still allowing for localization to be made into content with a high-ROI if it is generated earlier than expected.

A third exemplary method that might be used is very similar to the previous approach, but adds normalization of each category's ROI with respect to some baseline ROI (e.g., the median ROI among the categories, the net ROI of the site, or some manually specified value) using the formula below:

$$\text{Dynamic Budget} = b_C \times p^{\frac{ROI_{baseline}}{ROI_{category}}}$$

This baseline is particularly useful when the various category ROI's mostly tend to be skewed either below or above 100%. With this method, even though an ROI may seem to be low or high in isolation, it will be assigned a dynamic budget depending on the extent to which it is higher or lower than the baseline ROI. For example, half-way through a budgetary period (p=0.5), the dynamic proportion for an ROI of 60% using the second method would be 31%, calculated as 0.5 to the power of 1/(60%). Since this is a relatively low ROI, it is receiving a dynamic proportion that is less than the proportion of the month elapsed (i.e. 31%<50%). This is desirable to allow for budget to be reserved for later, higher-ROI localizations. However, on a website where all of the localizations are low in ROI, 60% may be a relatively high ROI and it would not make sense to limit its budget in order to wait for higher ROI opportunities. Specifically, if for example, the average ROI of localizations available on a site were 40%, the present method could be applied, resulting in a dynamic proportion of 62%, calculated as 0.5 to the power of (40%)/(60%). This category is now receiving a dynamic proportion that is higher than the proportion of the month elapsed (i.e. 62%>50%), which is desirable since it is among the higher ROI localizations given the baseline ROI of 40%.

Figure 20:
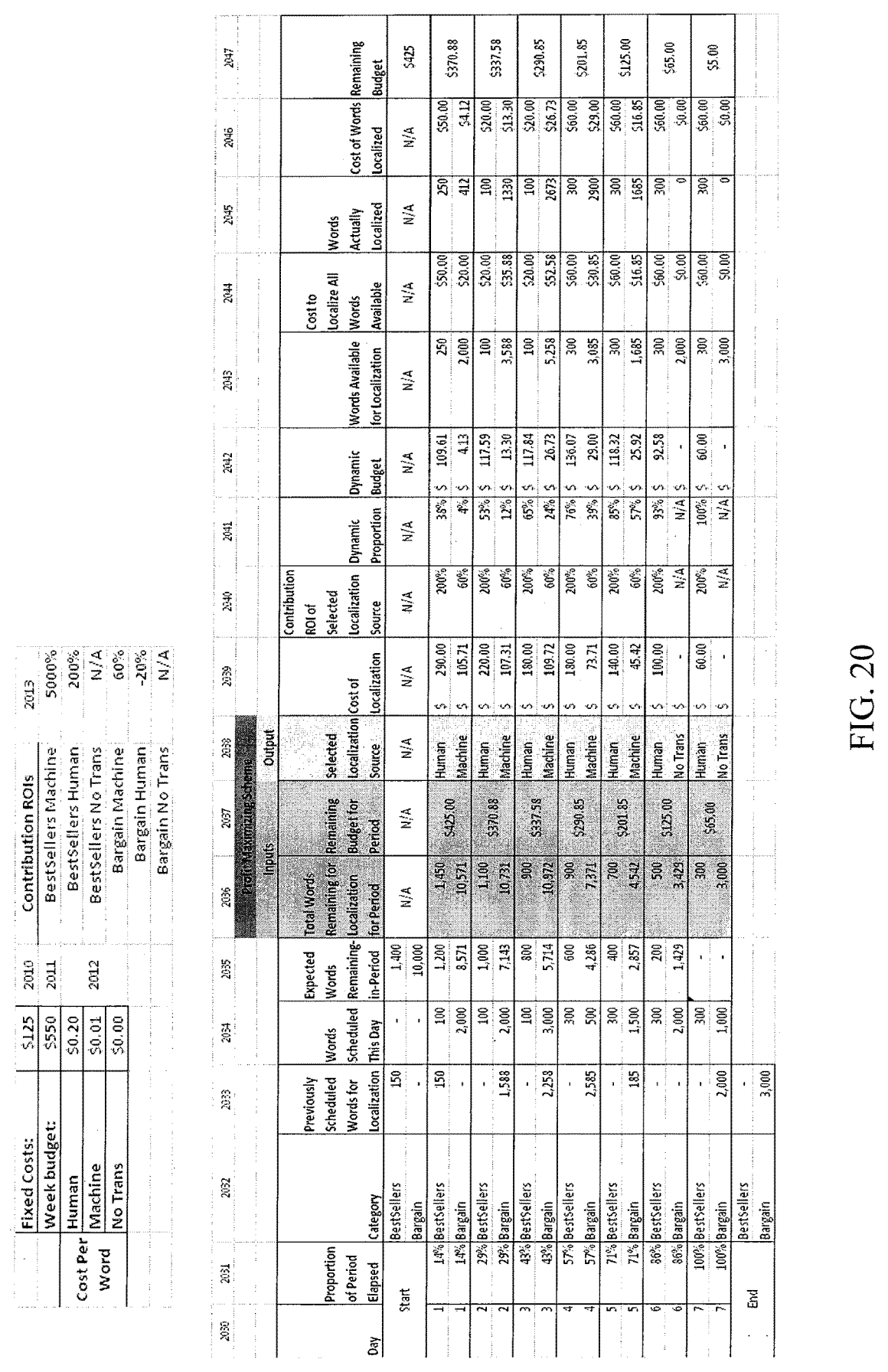

FIG. 20 shows an example of this method applied over a week time period to an example website with two product categories: "BestSellers" and "Bargain". Note that this example uses a 7 day period for simplicity of illustration. A more likely time period in practice would be a month or a quarter, as monthly or quarterly budgets are common; however, any time period from an hour to a day to a year or more may be used. A fixed cost of $125 is given at 2010 and an overall localization budget for the week of $550 is given at 2011. The fixed cost may be, for example, a hosting or management fee for operating the localized website billed by a third party. The cost-per-word rates for localization using each of three localization sources (Human, Machine and No Translation) is given at 2012. The contribution ROIs for each localization source and category pair are given at 2013. For example, the contribution ROI of localizing the BestSellers category using human translation is 200%. These ROIs may be calculated as described in FIGS. 13, 15, 16 and 17.

The first row of table, labeled "Start", describes the state before the first day of the period. In this example, after the last day of the previous period there were 150 words left to localize in the BestSellers category shown at 2033 labeled "Previously Scheduled Words for Localization". The expected number of words to be localized in the period is shown at column 2035 labeled "Expected Words Remaining-in-Period". At the start of this example period, it is expected that 1,400 words will need to be localized in the BestSellers category and 10,000 words in the Bargain category. The expected word counts may be, for example, based on historical data about the amount of localization performed in past periods for each category, which may be tracked by the present system and maintained in the financial database 390-c. The last column in the table at 2047 labeled "Remaining Budget" shows the amount of money that remains in the budget after all localizations are completed each day. At the start of the period, the full week budget at 2011 of $550, minus the fixed cost at 2010 of $125, or $425, is available since no localizations have been performed yet.

The day of the week under consideration is shown at 2030, and the proportion of the period elapsed, p, is calculated at 2031 as the day divided by 7, the total number of days in the period. On day 1, the proportion of the period elapsed is calculated at 14% by dividing day 1 over the 7 days in the period. As discussed above, on day one there are 150 words left over for localization in the BestSellers category from the previous period at 2033. Also given are the number of words that were generated for localization that day in each of the categories at 2034 labeled "Words Scheduled This Day". This is the actual number of words that have been scheduled for localization on that day, which, for example, can correspond to new content posted on the website 180 that day which now requires localization. On day one, 100 words were scheduled for localization from the BestSellers category and 2,000 from the Bargain category, The remaining words that are expected to be generated for localization in the remainder of the budgetary period is shown at 2035. For illustration purposes, this example uses a simple formula to generate the updated expected number of words for the remainder of the period. The formula determines the remaining number of words by multiplying the expected number of words from the "Start" state by the percentage of time left in the period. On day one, the percentage of time left in the period is approximately 86% (100%-14% at 2031) and the expected number of words from the "Start" state is 1,400 for BestSellers and 10,000 for Bargain. This results in 1,200 words remaining in the BestSellers category (86% of 1,400) and 8,571 words remaining in the Bargain category (86% of 10,000). Note that the values of these estimates do not change the logic of generating the dynamic budget. A more complex example that uses using Bayesian inference for estimating the remaining words that are expected to be generated for localization in the remainder of the budgetary period is described in FIGS. 21A and 21B.

The three word counts at 2033, 2034, and 2035 are added together to derive the total words remaining for localization for the budgetary period for each category at 2036 labeled "Total Words Remaining for Localization for Period". Also shown is the remaining budget for the period at 2037, which is taken from column 2047 from the previous day or the "Start" state. On day one, the remaining budget of $425 is taken from the "Start" state and represents the full budget since no money has yet been spent on any localization.

The total words remaining at 2036 and the remaining budget for the period at 2037, along with the cost-per-word rates at 2012 and the contribution ROIs at 2013 for each category, are provided as inputs to a profit maximizing scheme which is run each day of the period to determine the optimum localization source at that point in time for each category. Example profit maximizing schemes are described in FIGS. 17 & 19.

The selected localization source at 2038 shows the output of the profit maximizing scheme (based on the inputs at 2036, 2037, 2012 and 2013) after it is run that day to determine the optimum localization source for each category at that point in time. Based on these updated inputs, the scheme selects a localization source for each category such that localization investments remain within budget while maximizing profit. On day one, the profit maximizing scheme selected human translation as the optimum localization source for the BestSellers category and machine translation as the optimum localization source for the Bargain category.

The cost of localizing the remaining number of words using the selected localization source for each category is shown at 2039. This cost is calculated using the per word rate at 2012. For example, on day one the cost of localizing the BestSellers category using human translation at 2039 is $290 computed by multiplying the 1,450 remaining words at 2035 by the $0.20 per word rate of human translation at 2012. The contribution ROI at 2040 is reproduced for clarity from the appropriate localization source and category pair shown at 2013.

The previously discussed dynamic budget calculation method below is applied in this example to arrive at a dynamic proportion at 2041 and a dynamic budget at 2042:

$$\text{Dynamic Budget} = b_C \times p^{\frac{1}{ROI_{category}}}$$

For demonstrative purposes, the above formula is split up into 2 parts: the budget or expected cost ($b_C$) and the "dynamic proportion" of the budget, as follows:

$$\text{Dynamic Budget} = b_C \times \text{Dynamic Proportion}$$

Where $$\text{Dynamic Proportion} = \frac{1}{p^{ROI_{category}}}$$

To compute the dynamic proportion at 2041, the proportion p is taken from column 2031 and $ROI_{category}$ is taken from column 2040 for each category. This proportion represents the proportion of the forward-looking investment that is expected for this category that should be available for use during the current day. To come up with the dynamic budget at 2042, this is then multiplied by $b_C$, taken from 2039. This dynamic budget places an upper limit on how much can be invested on this day into each of the given categories. In this example, because the localization of "Bestsellers" has a higher ROI, the method assigns a greater proportion of the expected cost as being available for use at the beginning of the period (38% for BestSellers vs. 4% for Bargain for day one). Although this example divides the budgetary period into days, the same method could be applied on an hourly or continual basis, as long as the expected words remaining in period at 2035 could be updated with each application of the method.

The words available for localization at 2043 are computed by adding the previously scheduled words for localization at 2033 to the words scheduled this day at 2034. The cost of localizing all the words available using the selected localization source is shown at 2044. This is computed by multiplying the words available at 2043 by the per word rate at 2012. Based on whichever is lower, either the dynamic budget at 2042 or the cost of localizing all the available words at 2044, the number of words that are actually localized is given at 2045 with a corresponding cost at 2046, which is equal to the lower of the dynamic budget or the cost of localizing all available words. On day one, there are 250 words available for localization in the BestSellers category; and since the cost to localize all these words ($50) is less than the dynamic budget of $109.61 for day one, then all 250 words are localized. There are also 2,000 words available for localization in the Bargain category on day one; but since the cost to localize all these words ($20) is more than the dynamic budget of $4.13 for day one, then only 412 words are localized to be able to stay within the day's dynamic budget. That results in 1,588 words in the Bargain category that cannot be translated on day one and therefore carry over to day two as previously scheduled words at 2033. After the localization costs are incurred, the remaining budget is shown at 2047, which also carries over to the next day. Each subsequent day, new values are given for words scheduled this day at 2034 and for expected words remaining in period at 2035.

On day 6, this example shows how a profit maximization scheme would adapt to the reduced budget. Since a greater than expected number of words were generated in the Bargain category (at 2034 from day 1 to day 5) early in the budgetary period, there is a significant budget constraint. Applying both human translation to the expected words remaining in period for Bestsellers (500 words at 2036 multiplied by a per-word cost of $0.20 at 2012 for a cost of $100 at 2039) and machine translation to the expected words remaining in the period for Bargain (3,429 words at 2036 multiplied by a per-word cost of $0.01 at 2012 for a cost of $34.29, not shown) would have resulted in an localization investment decision totaling $134.29, or more than the remaining budget of $125 at 2037. As a result, the profit maximizing scheme instead determined that No Translation was the optimum localization source for the remainder of the Bargain content, leaving budget available for future higher-ROI localization investments, in particular human Translation of the 200 expected future words of BestSellers content shown at 2035 on Day 6.

One of the challenges in implementing a forward-looking periodically-updated profit maximizing scheme, such as the one described in FIG. 20, is the need to produce updated forward-looking estimates for expected amount of content to be localized. The example in FIG. 20 used a simple formula of subtracting the content generated so far from the initial estimate to come up with a remaining estimate. While intuitive, this approach has shortcomings since it fully believes the initial estimate without placing any importance on the data seen in the current period. Considering a not-unusual example where the initial estimate was 1,000 words to localize, and half-way through the period 1,200 words have already been scheduled for localization, this formula gives an unacceptable estimate of negative 200 words. A better approach involves taking the initial estimate for the period and periodically updating it as new content to localize becomes available during the period. This may be done, for example, by applying statistical inference, such as Bayesian inference, which can be used to take the initial prediction and update it using Bayesian updating with the data as it is observed.

To apply Bayesian inference, an initial belief or probability distribution is required. This can be generated several ways that may include, for example, (1) assuming that generation of units of content occurs at a time that is independent of other units of content (e.g., not specifically in batches, not with extended amounts of downtime in which non-generation of one unit of content strongly correlates with non-generation of another unit of content), a Poisson distribution with mean equal to the number of expected items can be used, and updated as products are observed, (2) a custom distribution based on historical content creation for that website or another similar website, and (3) a normal distribution.

When new content is made available for localization, Bayesian updating can be applied to get a new estimate of future content. To apply Bayesian updating, two inputs are required: a prior distribution and a likelihood distribution; and one output results: a posterior distribution. On the first application of Bayesian updating (e.g. day 1), the prior distribution is the initial distribution discussed in the previous paragraph, and on all subsequent applications the posterior distribution from the previous application becomes the new prior distribution. The likelihood distribution is constructed as the probability density of seeing the observed amount of new content that becomes available for localization as a function of one of the prior distribution's parameters (e.g. mean). The posterior distribution is generated by multiplying the prior distribution and the likelihood distribution and scaling the result such that its integral is one. A central measure of this posterior distribution (such as its mean or median) can be calculated using basic statistics and used as the updated expected amount of content to be localized.

Figure 21:
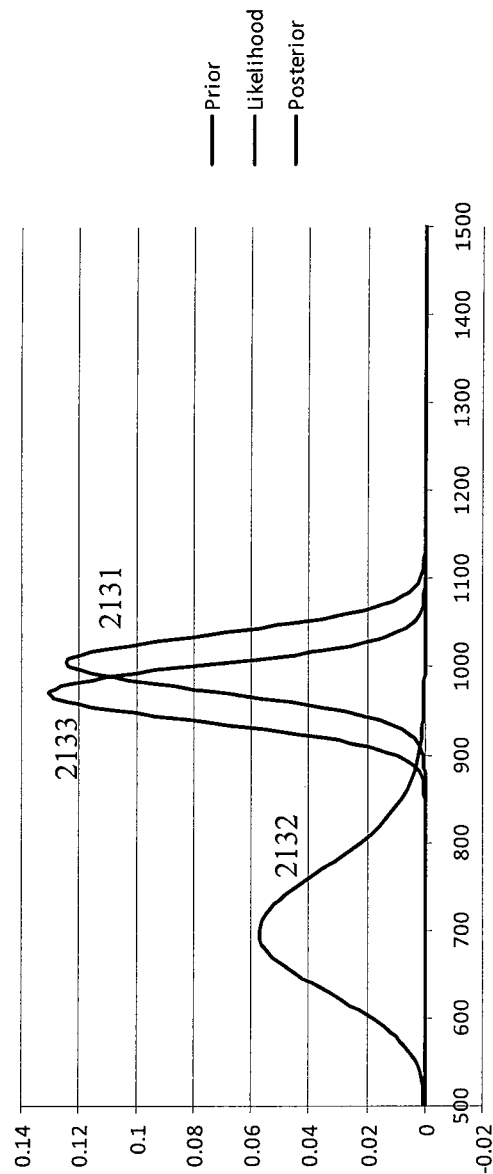
FIG. 21A shows an example of producing updated forward-looking estimates for expected amount of content to be localized by taking an initial prediction and periodically updating it.
FIG. 21B visualizes three distributions involved in the Bayesian updating process.

FIG. 21A shows an example of an initial expected number of words to be localized that is updated each day during a one week period based on the observed new content (i.e., new words scheduled for localization) that becomes available for localization each day. The resulting forecast of expected future words remaining in the period for each day is then used (along with already scheduled words still awaiting localization) to calculate the inputs to a profit maximizing scheme. For each day at 2110, a belief about the number of words expected per period is shown at 2111. On day 1, this may be based on, for example, an automatically calculated average from historical data. This is converted to a per day amount at 2112 by dividing by the total number of days in the period (7 in this example). The number of days remaining in the period at 2113 is then multiplied by this per-day expected number of words at 2112 to come up with the expected words in the remaining days of the period at 2114. This can be added to the total number of words scheduled for localization so far, shown at 2115, to obtain a total expectation for the period, shown at 2116. The observation for the day at 2117 shows the number of new words that are scheduled for localization on that day, which is used to apply the Bayesian updating.

FIG. 21B visualizes the three distributions involved in the Bayesian updating process when new words become newly available (i.e., are scheduled) for localization on day one, with the prior distribution at 2131, the likelihood distribution at 2132, and the posterior distribution at 2133. This example uses for its prior distribution at 2131 a normal distribution with a mean and variance both equal to 1,000, which is the expected number of words for the period on day one at 2111. On subsequent days, the posterior distribution from the previous day would be used instead. The likelihood distribution at 2132 is given by the probability density of seeing the observed number at 2117 as a function of the mean of number of words created per week. The mode of this distribution occurs at 700 (equivalent to 7 days multiplied by the number of words observed). The two distributions are multiplied together and the result is scaled such that its integral is one to arrive at the posterior distribution at 2133. The median of this distribution is used for the expected number of words per period at 2118 (though other central measures such as mean or mode could be used as well).

This is converted to a per day amount at 2119 by dividing by the total number of days in the period (7). The number of days remaining in the period after this date at 2120 is then multiplied by this per-day expected number of words from 2119 to come up with the expected words in the remaining days of the period at 2121. This number at 2121 would be used in FIG. 20 at 2035, which is added to the words scheduled on that day at 2034 and to any number of words previously scheduled but not yet localized at 2033, to arrive at the total words remaining for localization for the period at 2036, which is in turn the input to a profit maximizing scheme that determines the optimum localization source, as described in more detail in FIG. 20. For illustrative purposes, the total words observed so far at 2122 are calculated as the sum of the observed values from the beginning of the period up to present day, and the total expectation for the entire period at 2123 is calculated by adding the total words observed so far from 2122 to the expected words in days remaining from 2121. All 6 of these values from 2118-2123 are carried forward to the next day at 2111-2116, and the posterior distribution from the Bayesian updating is used as the prior distribution on the next day.

By applying Bayesian updating, the expected total number of words to be localized for the period at 2111 changes from the historical data based initial estimate of 1,000 words as new words become available for localization each day. For example, after day one, the number of words expected decreases to 960 based on the fact that on day one a less than expected amount of new words become available for localization (100 actual words vs. 143 expected words). Similarly, the number of words expected for the remainder of the period at 2121 is dynamically adjusted based on the number of new words that have become available for localization up to the current day. For example, after day four, 463 words are expected to remain to be localized in the final 3 days of the period.

When testing how the different localization sources affect the behavior associated with an element, the size of the samples can vary widely. For example, an online retailer that offers for sale on its website 100 different mobile phones may run a test using a sample size of 10 phones. On the other hand, a retailer that offers 1,000 different personal computers may run a test using 100 computers.

Although most of the examples provided herein are products offered for sale on an online retailer website, the present teaching is not limited to this type of content and can be applied to any type of content so long as criteria can be provided and taken into account in deciding how to localize each piece of content. For example, the decision process related to, e.g., promoting, for a particularly piece of content, the current localization source to a higher quality localization source and the automatic determination of a localization source with respect to a specific content can be applied to any type of content. In addition, specific criteria described herein may also be applied to any type of content, such as visitor traffic and/or the behavior of a visitor. As a result the present teaching is not limited to product content present on an online retailer's website. Criteria to be used in deciding a localization source are not limited to the exemplary ones described herein. Any criterion suitably developed based on application needs may be applied in the process of selecting localization sources for each element in content with multiple elements without deviating from the spirit of the present teaching.

Additional examples of content that can benefit from automatic determination of localization sources include: (1) advertisements supported content such as news, articles, blogs, forums, reviews, ratings, etc.; (2) travel related content such as hotels, flights, cruises, rentals, tours, etc.; (3) customer support content such as knowledge bases, forums, questions and answers, articles, manuals, guides, etc.; (4) archives or previous years' content such as news, articles, blogs, investor reports, government and regulatory filings, etc.; (5) user generated and third party content, such as product reviews, store locators, job boards, etc.; (6) locally relevant marketing and promotional content that may be of limited value in other languages; and (7) aggregated content, such as aggregators of products, news, reviews, etc.

Figure 22:
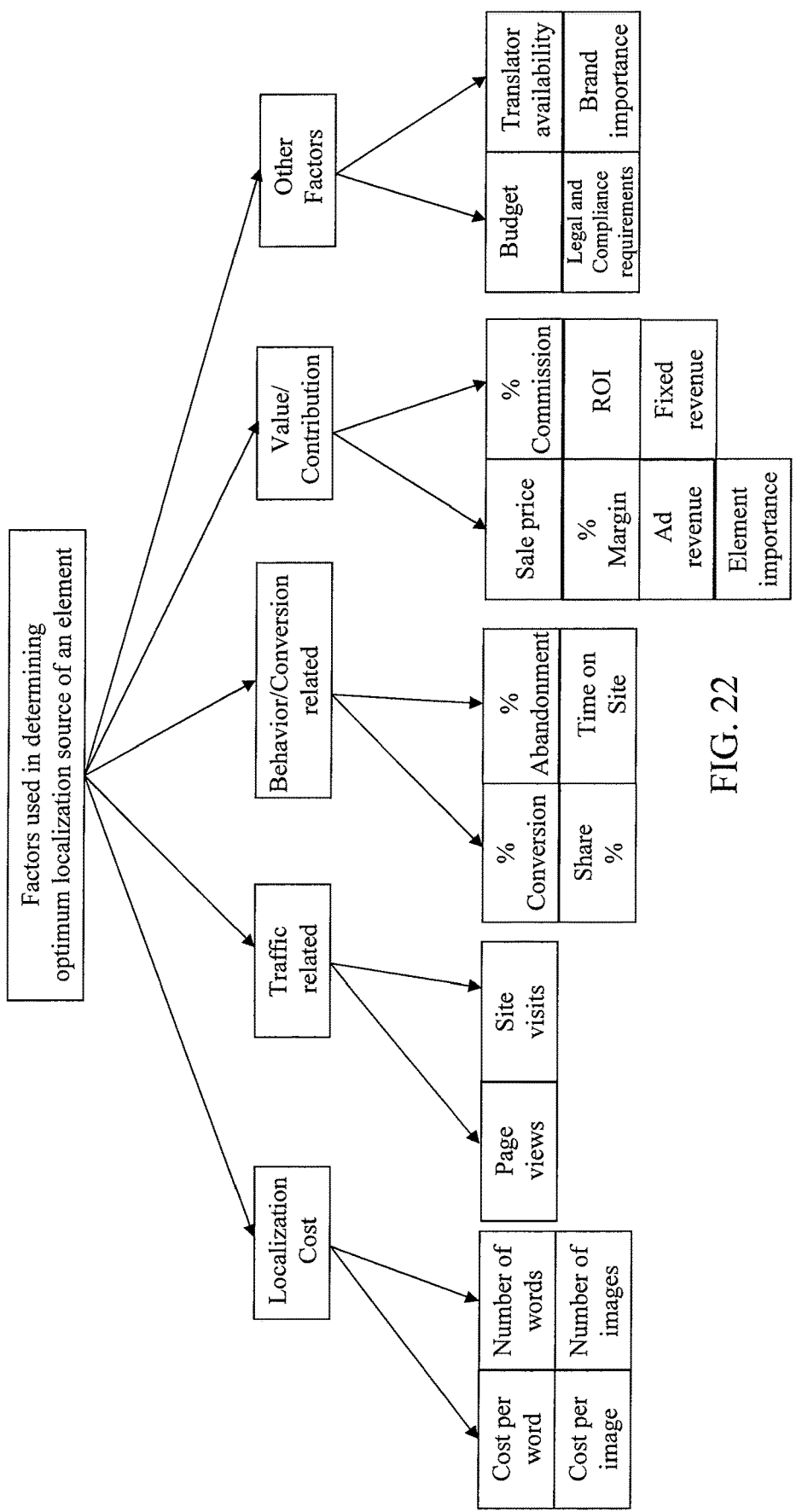
FIG. 22 is a tree diagram that shows exemplary factors that can be used in automatically determining a localization source for an element.

FIG. 22 is a tree diagram showing the hierarchical organization of the factors that can be used in determining a localization source of an element. The middle row of nodes represents the main categories of factors that can be used to determine a desired localization source. The leaf nodes at the bottom provide specific examples for each category.

The present teaching may be realized in hardware, software, firmware, or any combination thereof. A system according to one embodiment of the present teaching can be realized in a centralized fashion in one computer system or in a distributed fashion where different elements are spread across several interconnected computer systems. Any kind of computer system—or other apparatus adapted for carrying out the methods described herein—is suited. A typical combination of hardware, software, and firmware could be a general-purpose computer system with a computer program that, when being loaded and executed, controls the computer system such that it carries out the methods described herein.

An embodiment of the present teaching can also be embedded in a computer program product, which comprises all the features enabling the implementation of the methods described herein, and which—when loaded in a computer system—is able to carry out these methods. Computer program means or computer program as used in the present teaching indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer system to read such computer readable information.

Figure 23:
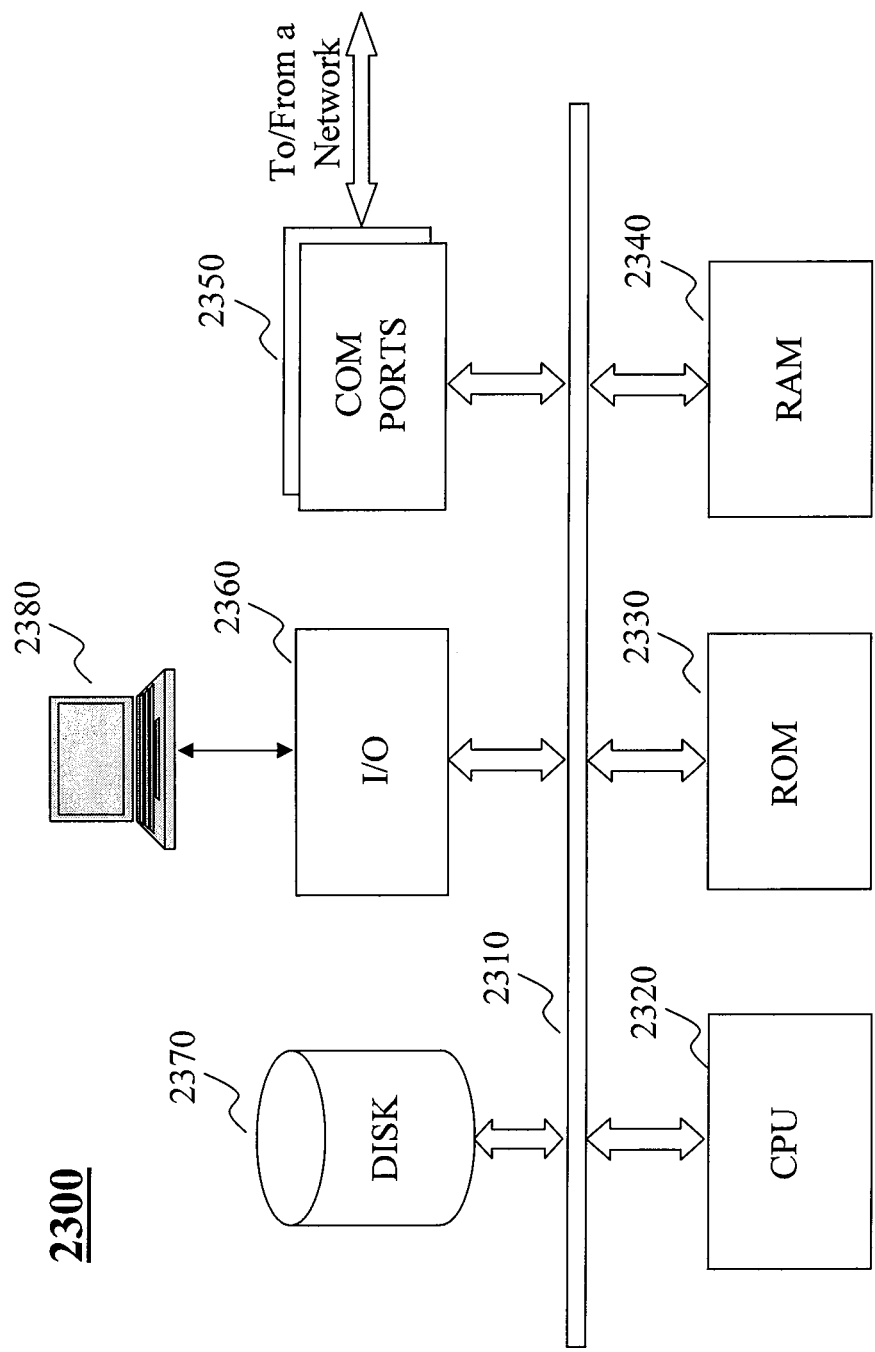
FIG. 23 is an exemplary block diagram showing a computer system useful for implementing the present invention.

FIG. 23 is a block diagram of an exemplary computer system useful for implementing the different aspects of the present teaching, such as value estimation, localization source computing, traffic monitoring, visitor behavior, contribution computing, localization source determination, localization source promotion/demotion, localization source routing, etc. The computer system includes one or more processors, such as processor 2320. The processor 2320 is connected to a communication infrastructure 2310 (e.g., a communications bus, cross-over bar, or network). Various software embodiments are described in terms of this exemplary computer system. After reading this description, it will become apparent to a person of ordinary skill in the relevant art(s) how to implement the teaching using other computer systems and/or computer architectures.

The computer system can include a display interface 2380 that forwards graphics, text, and other data from the communication infrastructure 1602 (or from a frame buffer not shown) for display on the display unit 2380. The computer system also includes a main memory 2340, preferably random access memory (RAM), and may also include a secondary memory. The secondary memory may include, for example, a hard disk drive 2370 and/or a removable storage drive, representing a floppy disk drive, a magnetic tape drive, an optical disk drive, etc. The removable storage drive reads from and/or writes to a removable storage unit in a manner well known to those having ordinary skill in the art. Removable storage unit, represents a floppy disk, magnetic tape, optical disk, etc. which is read by and written to by removable storage drive. As will be appreciated, the removable storage unit includes a computer usable storage medium having stored therein computer software and/or data.

In alternative embodiments, the secondary memory may include other similar means for allowing computer programs or other instructions to be loaded into the computer system. Such means may include, for example, a removable storage unit and an interface. Examples of such may include a program cartridge and cartridge interface (such as that found in video game devices), a removable memory chip 2330 (such as an EPROM, or PROM) and associated socket, and other removable storage units and interfaces which allow software and data to be transferred from the removable storage unit to the computer system.

The computer system may also include a communications interface 2350. Communications interface 2350 allows software and data to be transferred between the computer system and external devices. Examples of communications interface 2350 may include a modem, a network interface (such as an Ethernet card), a communications port, a PCM-CIA slot and card, etc. Software and data transferred via communications interface 1624 are in the form of signals which may be, for example, electronic, electromagnetic, optical, or other signals capable of being received by communications interface 2350. These signals are provided to communications interface 2350 via a communications path (i.e., channel). This channel carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 2340 and secondary memory 2330, removable storage drive, a hard disk installed in hard disk drive 2370, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 2340 and/or secondary memory 2330. Computer programs may also be received via communications interface 2350. Such computer programs, when executed, enable the computer system to perform the features of the present teaching as discussed herein. In particular, the computer programs, when executed, enable the processor 2320 to perform the features of the computer system. Accordingly, such computer programs represent controllers of the computer system.

Although specific embodiments of the teaching have been disclosed, those having ordinary skill in the art will understand that changes can be made to the specific embodiments without departing from the spirit and scope of the teaching. The scope of the teaching is not to be restricted, therefore, to the specific embodiments.

Other concepts relate to unique software for implementing the different aspects of the present teaching, such as determination of optimum localization source, translation server, etc. A software product, in accord with this concept, includes at least one machine-readable medium and information carried by the medium. The information carried by the medium may be executable program code data regarding web content translation and operational parameters. When such information carried by the medium is read by a machine, it causes the machine to perform programmed functions. In one example, a translation server located connected with the Internet executes instructions recorded on a medium and is capable of receiving a request for content translation, to obtain content in a first language from a publicly accessible source, analyzing the content in the first language, performing necessary translation based on the analysis, and forwarding, via a network, the translated content in a second language to a party that is requesting it.

The hardware elements, operating systems and programming languages of such translation servers are conventional in nature, and it is presumed that those skilled in the art are adequately familiar therewith. Of course, the server functions may be implemented in a distributed fashion on a number of similar or even different platforms, to distribute the processing load. Hence, aspects of the methods of receiving web content translation requests through a common communication port in a server or network device from a variety of client applications, as outlined above, may be embodied in programming.

Program aspects of the technology may be thought of as "products" or "articles of manufacture" typically in the form of executable code and/or associated data that is carried on or embodied in a type of machine readable medium. Tangible non-transitory "storage" type media include any or all of the memory of the computers, processors or the like, or associated modules thereof, such as various semiconductor memories, tape drives, disk drives and the like, which may provide storage at any time for the software programming.

All or portions of the software may at times be communicated through the Internet or various other telecommunication networks. Such communications, for example, may enable loading of the software from one computer or processor into another, for example, from a management server or host computer of the network operator or carrier into the platform of the message server or other device implementing a message server or similar functionality. Thus, another type of media that may bear the software elements includes optical, electrical and electromagnetic waves, such as those used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, the determination of optimum localization source server described above may be embodied in a hardware device, or it can also be implemented as a software only solution—e.g., requiring installation on an existing server. In addition, the various servers and components as disclosed herein can also be implemented as a firmware, firmware/software combination, firmware/hardware combination, or hardware/firmware/software combination.

We claim:

1. A method implemented on a computer having at least one processor, storage, and communication platform for determining a localization source for localizing an element present on a webpage, comprising the steps of:
   computing a cost of localizing the element when performed by each of one or more localization sources;
   obtaining at least one criterion with respect to the element based on which a localization source for the element is to be selected from the one or more localization sources;
   estimating, via tracking user interactions associated with the element on the webpage, a level of importance of the element with respect to the at least one criterion;
   selecting an initial localization source from the one or more localization sources for the element based on the level of importance and the cost;
   receiving, from the selected initial localization source, a localized element generated by localizing the element;
   incorporating the localized element into a localized version of the webpage;
   monitoring one or more measures computed based on the at least one criterion with respect to the element;
   determining a return on investment from the localized element based on the selected localization source and the one or more measures;
   dynamically determining an updated localization source for the element based upon the determined return on investment from the localized elements and a budget constraint;
   receiving, from the updated localization source, an updated localized element generated by localizing the element; and
   incorporating the updated localized element into an updated localized version of the webpage.

2. A system for determining a localization source for localizing an element present on a webpage, the system comprising a processor and a memory including instructions executed by the processor to perform the steps of:
   computing a cost of localizing the element when performed by each of one or more localization sources;
   obtaining at least one criterion with respect to the element based on which a localization source for the element is to be selected from the one or more localization sources;
   estimating, via tracking user interactions associated with the element on the webpage, a level of importance of the element with respect to the at least one criterion;
   selecting an initial localization source from the one or more localization sources for the element based on the level of importance and the cost;
   receiving, from the selected initial localization source, a localized element generated by localizing the element;
   incorporating the localized element into a localized version of the webpage;
   monitoring one or more measures computed based on the at least one criterion with respect to the element;
   determining a return on investment from the localized element based on the selected localization source and the one or more measures;

dynamically determining an updated localization source for the element based upon the determined return on investment from the localized elements and a budget constraint;

receiving, from the updated localization source, an updated localized element generated by localizing the element; and incorporating the updated localized element into an updated localized version of the webpage.

3. The method of claim 1, wherein the one or more localization sources comprise at least one of: a copy editing, a professional translation, a crowd translation, a human-edited machine translation, and a machine translation.

4. The method of claim 1, wherein the selected localization source is determined by at least one of:

selecting a localization source that yields a highest contribution profit margin;

selecting a higher quality localization source when the element receives more traffic and selecting a lower quality localization source when the element receives less traffic; and selecting a localization source based on visitor behavior on a web site.

5. The method of claim 1, wherein the selected localization source works in concert with a localized website/translation server to localize the element.

6. The method of claim 2, wherein the one or more measures comprise at least one of: market dynamics, ongoing viewership, economic return, profitability, margin, return on investment, visitor traffic, and visitor behavior.

7. The method of claim 1, wherein at least some localization sources selected for different elements on the webpage are different.

8. The method of claim 1, wherein the at least one criterion associated with the element depends on other elements in the webpage.

9. The method of claim 1, wherein the at least one criterion changes with respect to time.

10. The method of claim 1, wherein the localization source of a first element is different than the localization source of a second element.

11. The method of claim 1, wherein the localization source of a first element is same as the localization source of a second element.

12. A machine-readable tangible and non-transitory medium having information recorded thereon for determining a localization source for localizing an element present on a webpage, wherein the information, when read by the machine, causes the machine to perform the following:

computing a cost of localizing the element when performed by each of one or more localization sources;

obtaining at least one criterion with respect to the element based on which a localization source for the element is to be selected from the one or more localization sources;

estimating, via tracking user interactions associated with the element on the webpage, a level of importance of the element with respect to the at least one criterion;

selecting an initial localization source from the one or more localization sources for the element based on the level of importance and the cost;

receiving, from the selected initial localization source, a localized element generated by localizing the element;

incorporating the localized element into a localized version of the webpage;

monitoring one or more measures computed based on the at least one criterion with respect to the element;

determining a return on investment from the localized element based on the selected localization source and the one or more measures;

dynamically determining an updated localization source for the element based upon the determined return on investment from the localized elements and a budget constraint;

receiving, from the updated localization source, an updated localized element generated by localizing the element; and incorporating the updated localized element into an updated localized version of the webpage.

* * * * *